(12) United States Patent
Terai et al.

(10) Patent No.: US 8,380,823 B2
(45) Date of Patent: Feb. 19, 2013

(54) STORAGE MEDIUM STORING RELATION MANAGEMENT CONTROL PROGRAM, DEVICE, AND SYSTEM

(75) Inventors: Sachiko Terai, Kawasaki (JP); Sawao Iwatani, Kawasaki (JP); Shigeru Honmura, Kato-gun (JP); Hideyuki Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 624 days.

(21) Appl. No.: 11/235,413

(22) Filed: Sep. 27, 2005

(65) Prior Publication Data

US 2006/0020623 A1 Jan. 26, 2006

Related U.S. Application Data

(63) Continuation of application No. PCT/JP2004/002547, filed on Mar. 2, 2004.

(30) Foreign Application Priority Data

Apr. 10, 2003 (WO) .................. PCT/JP03/04577

(51) Int. Cl.
*G06F 15/16* (2006.01)
*G06F 15/173* (2006.01)
*G06F 11/00* (2006.01)

(52) U.S. Cl. ........ 709/220; 709/203; 709/217; 709/223; 714/2; 714/4.1; 714/25; 714/46

(58) Field of Classification Search .................... 709/220
See application file for complete search history.

(56) References Cited

U.S. PATENT DOCUMENTS

| 5,764,911 | A | 6/1998 | Tezuka et al. | |
|---|---|---|---|---|
| 5,796,736 | A | 8/1998 | Suzuki | |
| 5,926,463 | A | 7/1999 | Ahearn et al. | |
| 6,047,320 | A | 4/2000 | Tezuka et al. | |
| 6,377,987 | B1 * | 4/2002 | Kracht | 709/220 |
| 7,058,545 | B2 * | 6/2006 | Chang et al. | 702/186 |
| 7,237,138 | B2 * | 6/2007 | Greenwald et al. | 714/4.3 |
| 7,249,347 | B2 * | 7/2007 | Chang et al. | 709/220 |
| 2001/0042118 | A1 | 11/2001 | Miyake et al. | |
| 2001/0054093 | A1 | 12/2001 | Iwatani | |
| 2003/0056140 | A1 * | 3/2003 | Taylor et al. | 714/4 |
| 2003/0093509 | A1 * | 5/2003 | Li et al. | 709/223 |

(Continued)

FOREIGN PATENT DOCUMENTS

| EP | 0 773 649 | 5/1997 |
|---|---|---|
| EP | 0964546 | 12/1999 |

(Continued)

OTHER PUBLICATIONS

Office Action issued in corresponding Japanese Patent Application No. 2005-505339; mailed on May 7, 2008.

(Continued)

*Primary Examiner* — Ian N Moore
*Assistant Examiner* — Jenee Alexander
(74) *Attorney, Agent, or Firm* — Staas & Halsey LLP

(57) ABSTRACT

Device component information (physical information, logical information) on each device such as a host computer, a switch, and storage on the SAN is acquired via an LAN 9. Element information is created from the acquired device component information. According to the element information, a link between element information is created. Furthermore, when a plurality of links are established for an element, information is stored in advance so as to be used for selecting one of the links. Thus, each element stored the minimum information for routing and it becomes possible to search an associated element more effectively.

12 Claims, 29 Drawing Sheets

U.S. PATENT DOCUMENTS

| | | | |
|---|---|---|---|
| 2003/0135439 A1 | 7/2003 | Yagishita | |
| 2003/0233603 A1* | 12/2003 | Nagata | 714/48 |
| 2004/0054504 A1* | 3/2004 | Chang et al. | 702/186 |
| 2004/0054758 A1* | 3/2004 | Chang et al. | 709/219 |
| 2004/0064543 A1* | 4/2004 | Ashutosh et al. | 709/224 |
| 2004/0153708 A1* | 8/2004 | Joshi et al. | 714/4 |
| 2004/0181709 A1* | 9/2004 | Gibson et al. | 714/25 |
| 2004/0205089 A1* | 10/2004 | Alon et al. | 709/201 |
| 2005/0223264 A1* | 10/2005 | Arden et al. | 714/4 |
| 2006/0136490 A1* | 6/2006 | Aggarwal et al. | 707/103 R |
| 2007/0094378 A1* | 4/2007 | Baldwin et al. | 709/223 |
| 2007/0250302 A1* | 10/2007 | Xu et al. | 703/20 |

FOREIGN PATENT DOCUMENTS

| | | |
|---|---|---|
| EP | 1115225 | 7/2001 |
| JP | 2-148951 | 6/1990 |
| JP | 3-252732 | 11/1991 |
| JP | 4-266249 | 9/1992 |
| JP | 9-127857 | 5/1997 |
| JP | 10-294731 | 11/1998 |
| JP | 11-175815 | 7/1999 |
| JP | 11-340980 | 12/1999 |
| JP | 2001-136199 | 5/2001 |
| JP | 2001-249856 | 9/2001 |
| JP | 2002-63063 | 2/2002 |
| JP | 2003-208413 | 7/2003 |

OTHER PUBLICATIONS

Supplementary European Search Report issued Nov. 24, 2008 in corresponding European Patent Application No. 04716380.3.
European Office Action dated Jun. 8, 2012 issued in corresponding European Patent Application No. 04716380.3.

\* cited by examiner

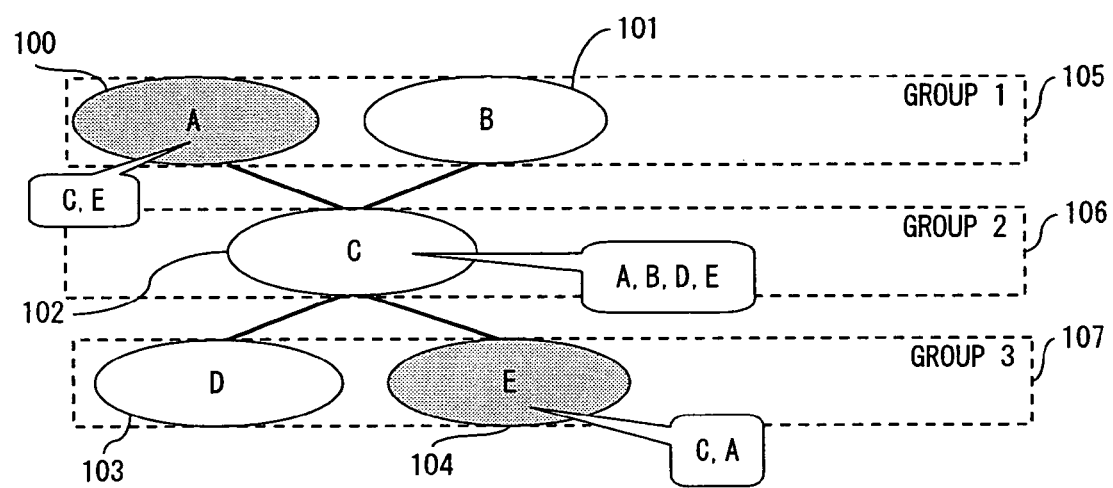
F I G. 1

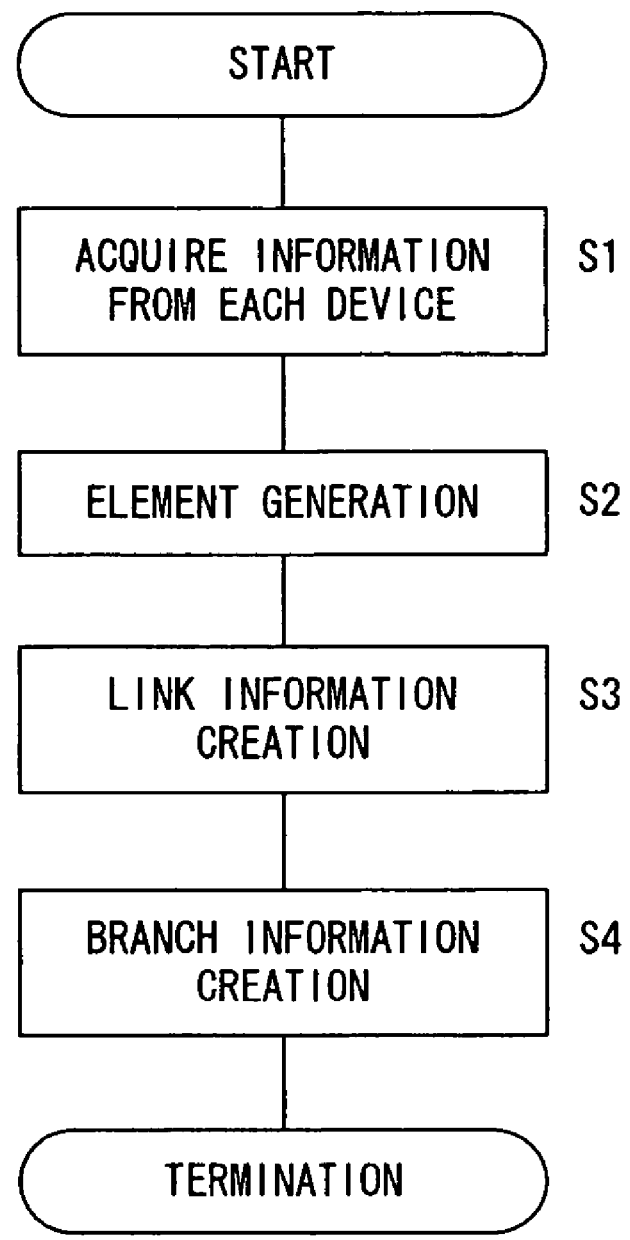
F I G. 5

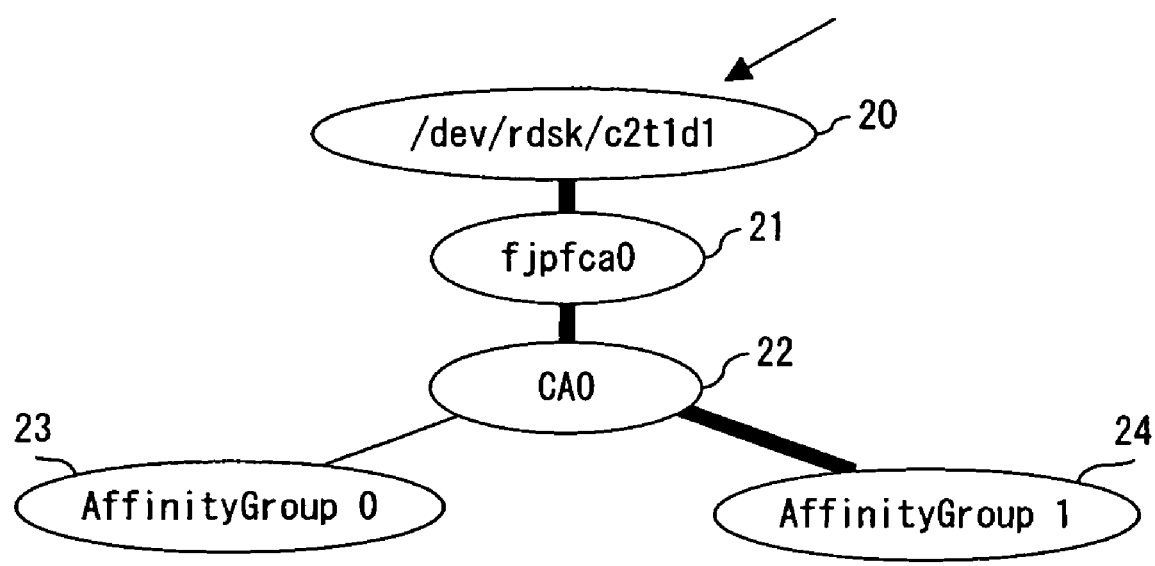
F I G. 6

| VARIABLE NAME | VALUE | EXPLANATION OF VARIABLE |
|---|---|---|
| Name | /dev/rdsk/c2t1d1 | OBJECT NAME OF THE ELEMENT |
| ParentLinkID | --- | NAME OF LINKED OBJECT IN HIGHER-LEVEL |
| ChildLinkID | fjpfca0 | NAME OF LINKED OBJECT IN LOWER-LEVEL (INPUT VALUE OF THE SEARCHED OBJECT WITH ITS CONTROLLER NUMBER OF 2) |
| BranchCheckID | AffinityGroup1 | (INFORMATION REQUIRED TO SELECT ONE OF TWO CHILD LINKS IN CA 0) |

FIG. 7

| VARIABLE NAME | VALUE | EXPLANATION OF VARIABLE |
|---|---|---|
| Name | fjpfca0 | OBJECT NAME OF THE ELEMENT |
| ParentLinkID | /dev/rdsk/c2t1d1 | NAME OF LINKED OBJECT IN HIGHER-LEVEL (INPUT VALUE OF THE SEARCHED RAW DEVICE STARTING WITH C2) |
| ChildLinkID | CA0 | NAME OF LINKED OBJECT IN LOWER-LEVEL (INPUT VALUE AFTER SEARCHING OBJECT WITH WWPN OF CONNECTED WWPN) |
| ControllerNumber | 2 | CONTROLLER NUMBER OF THE HBA PORT |
| WWPN | 100000000E2441AD | WWPN NUMBER OF THE HBA PORT |
| ConnectedWWPN | 210000000EDA00CD | WWPN NUMBER OF COUNTERPART CONNECTED TO THE HBA PORT |

F I G. 8

| VARIABLE NAME | VALUE | EXPLANATION OF VARIABLE |
|---|---|---|
| Name | CA0 | OBJECT NAME OF THE ELEMENT |
| ParentLinkID | fjpfca0 | NAME OF LINKED OBJECT IN HIGHER-LEVEL |
| ChildLinkID | AffinityGroup0, AffinityGroup1 | NAME OF LINKED OBJECT IN LOWER-LEVEL |
| WWPN | 210000000EDA00CD | WWPN NUMBER OF THE CA PORT |
| AFFINITY INFORMATION | 100000000E2441AD AffinityGroup1 | : DEFINITION OF COUNTERPART WWPN PERMITTING THE ACCESS WITH THE CA AND AFFINITY GROUP PERMITTING THE USE |
| AffinityGroup | 0, 1 | AFFINITY GROUP NUMBER SET TO THE CA |

FIG. 9

| VARIABLE NAME | VALUE | EXPLANATION OF VARIABLE |
|---|---|---|
| Name | AffinityGroup0 | OBJECT NAME OF THE ELEMENT |
| ParentLinkID | CA0 | NAME OF LINKED OBJECT IN HIGHER-LEVEL |
| ChildLinkID | — | NAME OF LINKED OBJECT IN LOWER-LEVEL |

F I G. 1 0

| VARIABLE NAME | VALUE | EXPLANATION OF VARIABLE |
|---|---|---|
| Name | AffinityGroup1 | OBJECT NAME OF THE ELEMENT |
| *ParentLinkID* | CA0 | NAME OF LINKED OBJECT IN HIGHER-LEVEL |
| *ChildLinkID* | --- | NAME OF LINKED OBJECT IN LOWER-LEVEL |

F I G. 1 1

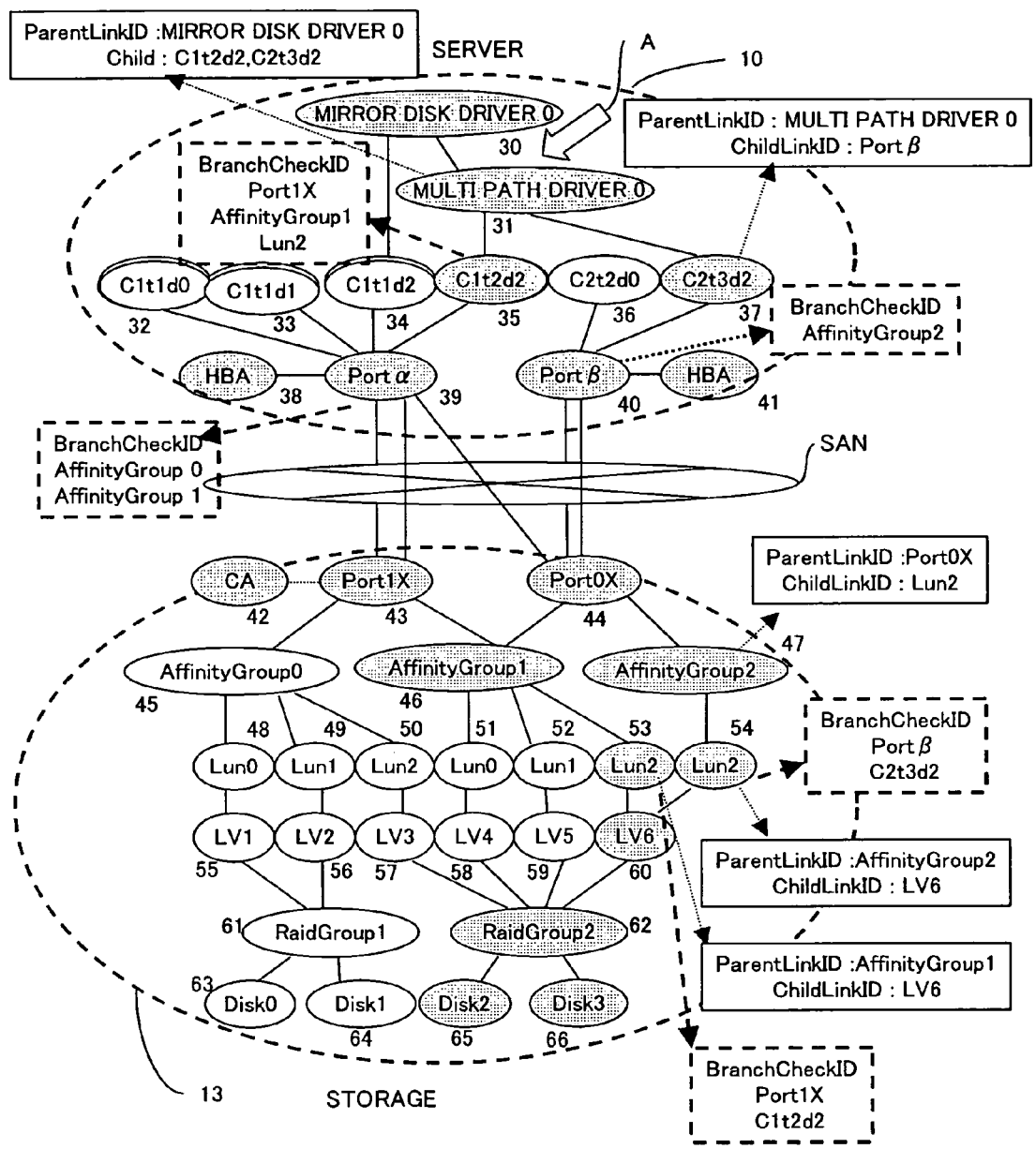
F I G. 1 5

```
BranchCheckID
  Port1X
  AffinityGroup1
  Lun2
```

FIG. 20

```
BranchCheckID
  AffinityGroup0
  AffinityGroup1
```

FIG. 21

| STATE | DATA | NAME OF THE DEVICE | MONITOR | EVENT ID | EVENT INFORMATION |
|---|---|---|---|---|---|
| ⊗ Error | 2003/09/10 11:27:27 | E6000-000001 | SSC | | CA(0x11003400) degraded |
| ⚠ Warning | 2003/09/10 11:27:29 | E6000-000001 | SSC | | CA(0x11002400) CHECK-1 |

FIG. 29

STORAGE MEDIUM STORING RELATION MANAGEMENT CONTROL PROGRAM, DEVICE, AND SYSTEM

CROSS REFERENCE TO RELATED APPLICATION

This application is a continuation of PCT application of PCT/JP2004/002547, which was filed on Mar. 2, 2004.

BACKGROUND OF THE INVENTION

1. Field of the Invention

The present invention relates to a program and a device to manage a storage area network (hereinafter referred to as SAN), which links a plurality of servers and/or a plurality of storages using a fiber channel network.

2. Description of the Related Art

Current computer system comprises a physical element such as hardware, and a logical element such as data area and memory address as elements constituting the system. However, the advance of communication technology has been making the relation of these elements increasingly complex with the expansion of a system environment caused by increasing the number of computers connected by networks such as the Internet, a LAN and a WAN.

Consequently, relation management software and system, expressing the connection between elements in terms of relation between these elements, have emerged (for example, Patent Reference 1, Patent Reference 2, Patent Reference 3, and Patent Reference 4). Here, the relation management means how such a number of elements are associated with each other.

As a method for managing a computer system, the method shown in FIG. 1 is commonly used. In FIG. 1, there are elements A (100), B (101), C (102), D (103), and E (104). The element A (100) and the element B (101) are the same kind of element, and the element D (103) and the element E (104) are the same kind of element. A group 1(105) consisting of the elements A and B, a group 2(106) consisting of the element C and a group 3 (107) consisting of the elements D and E are groups in the unit of collection of the same kind of elements. And the element A is linked with the element C, the element B is linked with the element C, the element C is linked with the element D, and the element C is linked with the element E.

In such a manner, a hierarchy is established by organizing the three groups. Here, each of the elements A, B, C, D and E has link information, indicating which of the other elements it is linked to. For example, the element A has the information that it is linked to the element C. The element B has the information that it is linked to the element C. The element C has the information that it is linked to the element A, the element B, the element D and the element E. The element D has the information that it is linked to the element C. The element E has the information that it is linked to the element C.

As the method for storing the association information of each element as described above, a method for storing all information on other elements associating with each one of the elements is used. In such a case, if the element A is linked to the element E via the element C, the element A stores the information on the element C and the element E, the element E stores the information on the element D and the element A, and the element C stores the information on the elements A, B, D, and E because the element C is relating to every element.

Patent Reference 1:

Japanese unexamined patent publication bulletin No. 04-266249 (pp. 1-5, FIG. 1~FIG. 9)

Patent Reference 2:

Japanese unexamined patent publication bulletin No. 10-294731 (pp. 1~11, FIG. 1~FIG. 25)

Patent Reference 3:

Japanese unexamined patent publication bulletin No. 11-340980 (pp. 1-11, FIG. 1~FIG. 25)

Patent Reference 4:

Japanese unexamined patent publication bulletin No. 2002-63063 (pp. 1-11, FIG. 1~FIG. 10)

However, the method for storing all information of the other element associated with each one of the elements, described above, has a demerit in that the data volume, which each element carries, would become enormous as the number of total elements increases.

As explained above, the conventional relation management software only expresses the links between elements, and an effective method as means for managing the relation over a plurality of elements is not provided. To manage the relation over a plurality of elements, all information on the related elements is required to be held. Therefore, the information held by each element has enormous volume, which causes problems such as wasting a limited memory source and slowing down the processing speed by unnecessary loading.

On the SAN, the system for automatically detecting trouble location and for maintaining and recovering of the trouble location had not existed in the past, and in case of trouble, because it relies on manual effort, a large amount of work is required to recover the network.

In light of the above problems, the present invention provides a program and a device in which each element stores the minimum information for routing and searches the associated elements more effectively. The present invention further provides a program and a device, which facilitates maintenance and recovery of the device on the SAN.

SUMMARY OF THE INVENTION

The above programs can be solved by providing a relation management control program, which makes a computer execute management process of a relation among a host computer, a switch device and a storage device, constituting a storage area network. The relation management control program allows a computer to execute a device component information acquisition process, which acquires device component information, which is the information for configuring each of the devices of the host computer, the switch device and the storage device, an element information creation process, which creates an element information corresponding to the device component information based on the device component information acquired by the device component information acquisition process, an association process, which associates each of the pieces of element information to each other based on a plurality of pieces of element information created by the element information creation process, and a branch selection information creation process, which creates branch selection information for selecting one piece from a plurality of pieces of element information.

With such a configuration, because only information for selecting one piece of element information from a plurality of pieces of element information is to be held, the volume of information held for routing between elements is reduced compared with the conventional method, and therefore memory resource can be saved.

The above problems can be solved by providing the relation management control program according to claim 1, wherein the association process associates the element information and establishes a hierarchical link structure.

Such a configuration enables the configuration of a hierarchical link of the element based on physical information and logical information of each device.

The above problems can be solved by providing the relation management control program according to claim 1, wherein the branch selection information creation process creates the branch selection information based on a plurality of pieces of element information associated by the association process, and stores the created branch selection information in each piece of the element information.

Such a configuration allows generation and retention of the branch selection information for selecting element information leading to a proper destination among a plurality of pieces of destination element information.

The above problems can be solved by providing a relation management control program, which makes a computer execute management process of relation among a host computer, a switch device and a storage device, constituting a storage area network. The relation management control program allows a computer to execute a search control process in which a plurality of pieces of element information corresponding to device component information indicating a configuration of a host computer, a switch device and a storage device respectively, are created, which searches for the element information in a prescribed direction starting from the first piece of element information of a plurality of pieces of element information based on the association information associating the pieces of element information to each other and the branch selection information, which is information for selecting one piece of element information from a plurality of pieces of element information, a branch selection information acquisition process, which acquires the branch selection information, and a branch destination element determination process, which determines one piece among a plurality of pieces of element information, when the second piece of element information, retrieved by the search control process, is associated with the other in a plurality of pieces of element information, based on the branch selection information acquired by the branch selection information acquisition process.

With such a configuration, because the element in search holds information to specify the element in the destination (i.e. with which element the element is associated), a series of element information associated with specific element information can be searched effectively.

The above programs can be solved by providing a relation management control device, which manages relation among a host computer, a switch device and a storage device, constituting a storage area network. The relation management control device comprises device component information acquisition means, which acquires device component information, which is the information for configuring each of the devices of the host computer, the switch device and the storage device, element information creation means, which creates an element information corresponding to the device component information based on the device component information acquired by the device component information acquisition means, association means, which associates each piece of element information to another based on a plurality of pieces of element information created by the element information creation means, and branch selection information creation means, which creates branch selection information for selecting one piece of element information from a plurality of pieces of element information.

With such a configuration, because only information for selecting one piece from a plurality of pieces of element information is to be held, the volume of information held for routing between elements is reduced compared with the conventional method, and therefore memory resource can be saved.

BRIEF DESCRIPTION OF THE DRAWINGS

The present invention will be more apparent from the following detailed description in conjunction with the accompanying drawings, in which:

FIG. 1 shows a concept of information, which each of the conventional elements holds;

FIG. 5 is a process flow in the first embodiment;

FIG. 6 describes a hierarchical link structure between elements in the first embodiment;

FIG. 7 provides an example of information stored in an element /dev/rdsk/C2*t*1*d*1 in FIG. 6 in the first embodiment;

FIG. 8 provides an example of information stored in an element fjpfca0 in FIG. 6 in the first embodiment;

FIG. 9 provides an example of information stored in an element CA0 in FIG. 6 in the first embodiment;

FIG. 10 provides an example of information stored in an element Affinity Group 0 in FIG. 6 in the first embodiment;

FIG. 11 provides an example of information stored in an element Affinity Group 1 in FIG. 6 in the first embodiment;

FIG. 15 describes physical information and logical information of a host and storage in the first embodiment;

FIG. 20 shows branch check ID temporarily stored in the second embodiment;

FIG. 21 shows branch check ID stored in the port α in the second embodiment;

FIG. 29 shows a history dialog box indicating the state of each device on the SAN in the third embodiment.

DESCRIPTION OF THE PREFERRED EMBODIMENTS

Figure 2:
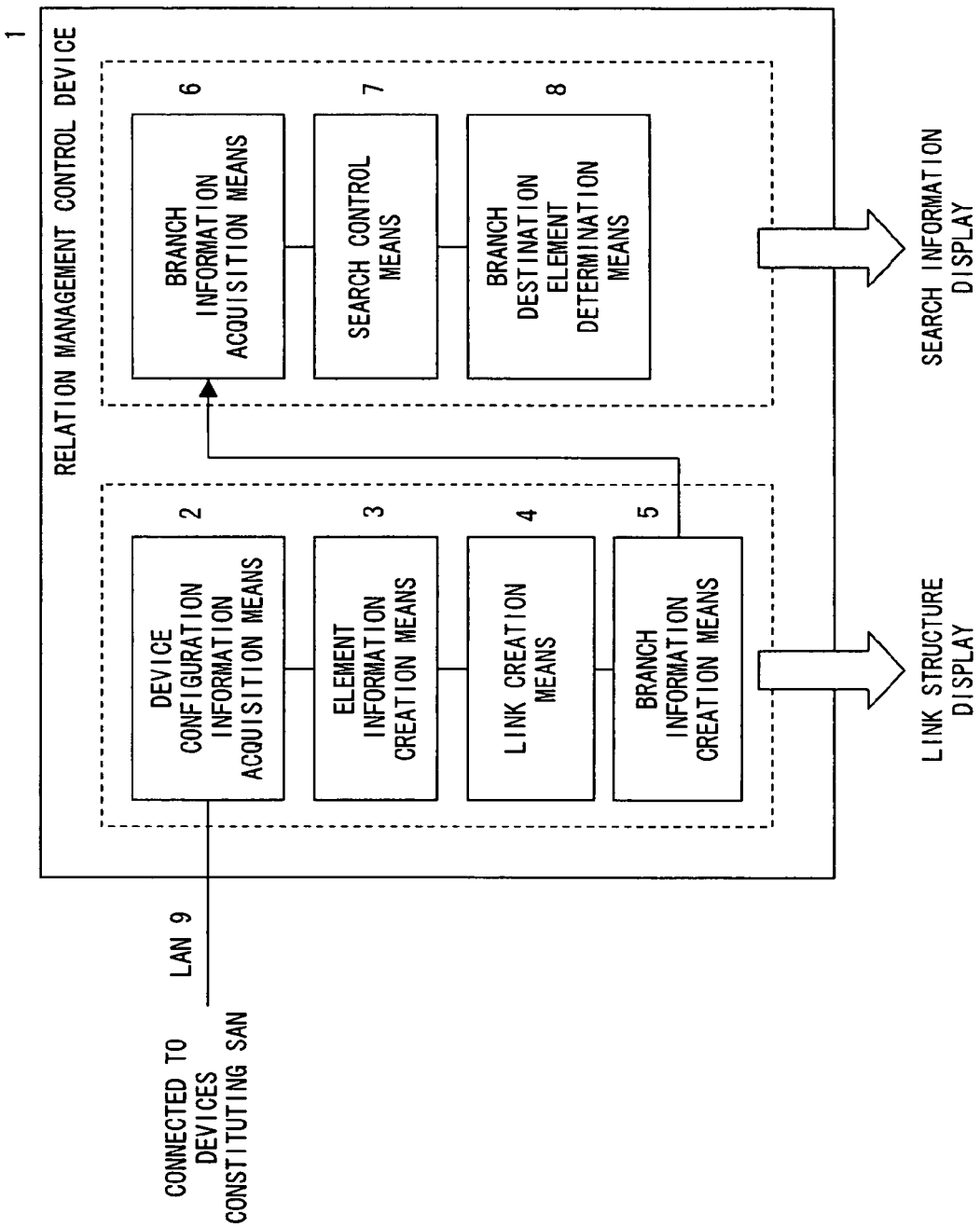
FIG. 2 describes an overview configuration of the present invention.

FIG. 2 illustrates an overview of the configuration of the present invention. In FIG. 2, a device 1 with software relating to the present invention installed (hereinafter referred to as relation management control device 1) is connected to a host computer, a switch and storage etc. on the SAN via an network such as a LAN.

The relation management control device 1 consists of device configuration information acquisition means 2, element information creation means 3, link creation means 4, branch information creation means 5, branch information acquisition means 6, search control means 7, and branch destination element decision means 8.

In the device configuration information acquisition means 2, device component information, which is physical information and/or logical information, is acquired from each device such as a host computer, a switch and storage establishing the SAN via LAN 9 (Local Area Network). In the element information creation means 3, element information is created from the acquired device component information. In the link creation means 4, a link between element information is created according to the element information. In the branch information creation means 5, information is stored in advance so as to be used for selecting one of the links when a plurality of links are established.

The link structure representing relation between elements is shown in the display of the relation management control device 1.

In the search control means 7, search operation is controlled. In the branch information acquisition means 6, branch selection information of the searched element is acquired. In the branch destination element decision means 8, the branch destination element is determined according to the branch selection information. Then, a group of elements associated with a prescribed element is searched, and shown in the display of the relation management control device 1.

Figure 3:
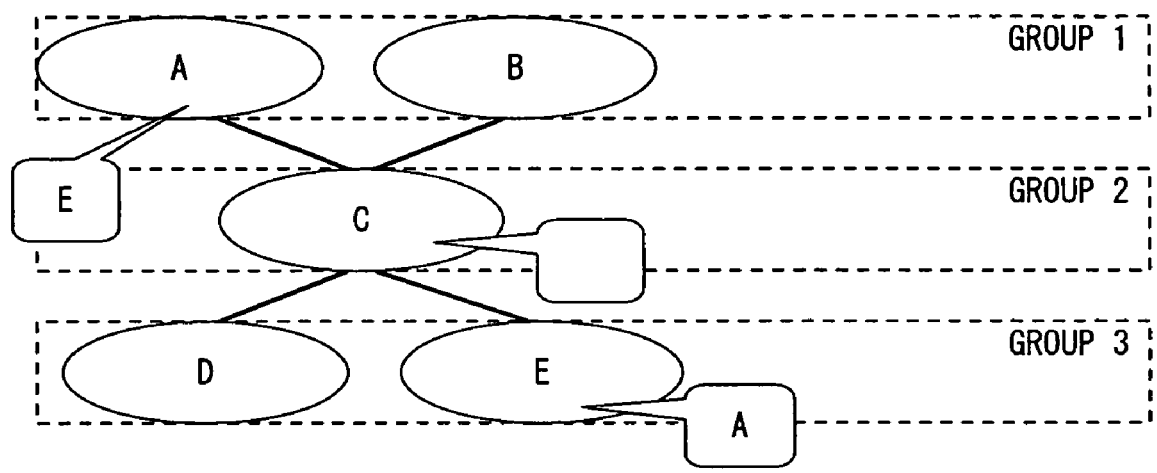
FIG. 3 shows a concept of information, which each of the elements in the present invention holds.

FIG. 3 shows a concept of the information, which each element holds, in the present invention. In FIG. 3, only information on the element E is stored in the element A, and only the information on the element A is stored in the element E. When searching the element associated with the element A, the search proceeds downward (search forward), and the element C is first retrieved.

As search forward further proceeds, the element D and the element E are retrieved, however because only information on the element E is stored in the element A, the element E is selected. If the information on the element E is not stored in the element A, the element D and the element E are selected in the search forward after retrieving the element C.

When the information held in the element A in FIG. 3 is compared with that in the element A in FIG. 1, two information on the elements C and E are held in FIG. 1, whereas only one information on the element E is held in FIG. 3. The same fact is applied to the element E. Accordingly, the information, which each element holds, can be less than that in the past, and the information laid out in a memory can be reduced.

In the present invention, in a case that each element stores the link information of other elements linked with the element, the link between elements can be defined by only storing the efficient information when the hierarchy is clearly defined as explained above.

<The First Embodiment>

Figure 4:
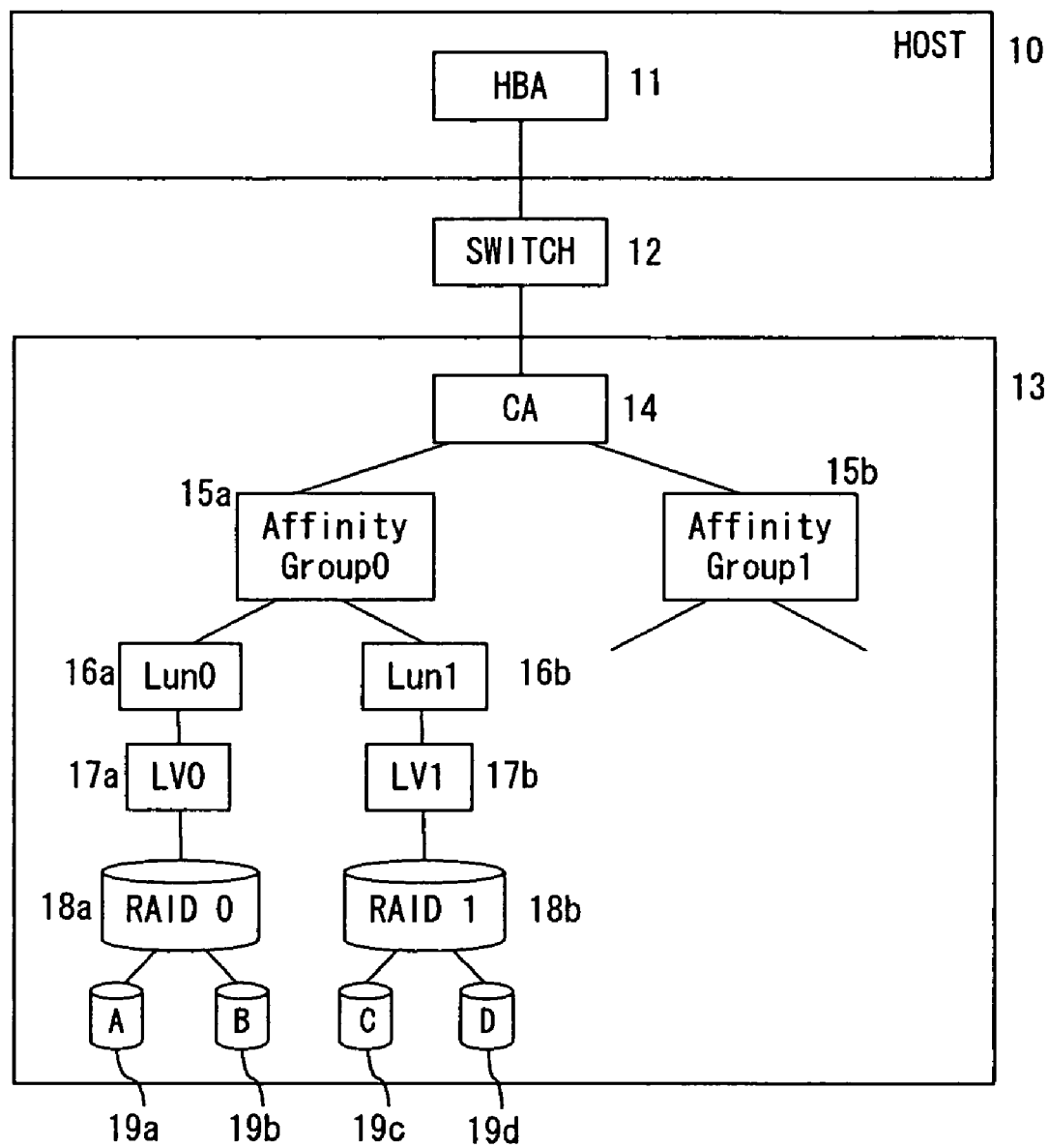
FIG. 4 describes a physical and logical overview configuration of the SAN in the first embodiment.

FIG. 4 describes the physical and logical configuration overview of the SAN in the present embodiment. A host 10 is connected to a switch 12 through a fiber channel (hereinafter referred to as FC) via a host-bus adapter (hereinafter referred to as HBA) 11, and a storage device 13 is connected to the switch 12 via a fiber channel adapter (hereinafter referred to as CA) 14.

RAID 0 (RAID: Redundant Array of Inexpensive Disks) (18a) consists of hard disks A (19a) and B (19b), and RAID 1 (18b) consists of hard disks C (19c) and D (19d).

Lun (Logical Unit Number) is the number of Lu (Logical Unit), which is a logical disk unit assigned by a server side, and the present invention has Lun 0 (16a) and Lun 1 (16b).

Lun V is an RAID with its inside segmented into logical volume, and each Lun V corresponds to each Lun. The present embodiment has Lun V0 (17a) corresponding to Lun 0 (16a), and Lun V1 (17b) corresponding to Lun 1 (16b).

Affinity Group (affinity group) is an access unit from the host set on the port of CA, and there are an Affinity Group 0 (15a) and an Affinity Group 1 (15b) in FIG. 4. In a level under the affinity group 0 (15a) are Lun 0 (16a) and Lun 1 (16b). The numbers of HBA 11 and the switch 12, the CA 14, the affinity group 15, the Lun 16, the LV 17, the RAID 18 and the disk 19 are not limited as shown in FIG. 4.

FIG. 5 shows a processing flow in the present embodiment. First, the relation management control device 1 acquires the device component information of physical information (the HBA 11, the CA 14, etc.) and logical information (the Affinity Group, the Lun, the Lun V, etc.) from each device of the host 10, the switch 12 and the storage 13 in FIG. 4 (Step S1) (Step is hereinafter abbreviated to S).

Next, elements are generated according to the acquired device component information (S2). The element here is defined as an object corresponding to physical information when the acquired device component information is information indicating a physical component of the device, and as an object corresponding to logical information when the acquired device component information is the logical component. All the physical information and the logical information acquired are established (generated) as elements. The generated elements are given the unique name (ID). That is, it is defined that the name of each element is unique among all elements.

Next, based on the information, which each element holds, a relation-making is carried out between elements, and a hierarchical link structure of the all elements generated is formed (S3). Here, the relation-making means to store the ID of the element laying in higher-level hierarchy of an element X in the object of the element X as a Parent Link ID, and the ID of the element in lower-level hierarchy as a Child Link ID in the object of the element X. As to information of the laterally related element, the ID of the element is stored in the object of the element X as a Relative Link ID. In such a way, each element stored the IDs of its related elements.

In S3 as explained above, the Parent Link ID, the Child Link ID and the Relative Link ID, which is the information indicating the relation of connection between physical components, relation of implementation, and relation of logical components, are to become link information. This is relation information of A-C, B-C, C-D, and C-E indicating the hierarchical relation between the groups holding the same information, as described in S3.

Next, branching information is generated (S4). In S4, specific relation information beyond the groups is generated from the information, which each element holds. This specific relation information is the information (specific logical relation information) about which of the elements one element has logical relation with when an element relates with the elements and devices in the other group. The relation management can be traced based on the specific logical relation information. This specific logical relation information or the branching information is hereinafter referred to as a Branch Check ID (branch check ID).

In the longitudinal and lateral link information set in the above process, although the link information is created on all relations of each element, the relation with specific elements in further high-level hierarchy or further low-level hierarchy is not yet clear. In order to perform search that reaches a specific element, selection of one link among a plurality of links is required to be performed somewhere, and the Branch Check ID is created as the information for selection.

For example, given that, in the process of searching the relation of an element Z with the other elements, there is a case that which element should be selected is not clear when the link is extended from the element passed through to a plurality of elements in the same level (group) during the search. In such a case, the relation management of the elements relating with the element Z can be understood by making the element Z contain the branch check ID, which is the information indicating which branch destination element is to be selected when the search passing through the element with branching.

Each element is configured as an object, and stores the parent link ID, the child link ID, the branch check ID and the other information in the variable of the inside objects. Here, taking an example of the hierarchical link structure in FIG. 6, an example of the information, which each element contains as an object, is explained with reference to FIG. 7 through FIG. 11.

FIG. 6 has an element /dev/rdsk/02t1d1 (20) in the most highest-level in the hierarchy, and the lower-level hierarchy of the element 20 is an element fjpfca0 (21), and under the element 21 is an element CA0 (22), and under the element 22 are the Affinity Group 0 (23) and the Affinity Group 1 (24) in the same-level hierarchy. In FIG. 6, when the element /dev/edsk/C2t1d1 is selected, the route of the element 20—the element 21—the element 22—the element 24 is emphasized (indicated with bold line in FIG. 6).

FIG. 7 indicates an example of the information stored in the element /dev/rdsk/C2t1d1 (20) (Row Device Object). In FIG. 7, a variable Name is object name of the element, and, in this case, stores the value "/dev/rdsk/C2t1d1". The variable Parent Link ID stores the object name of the linked object locating in higher-level hierarchy. In FIG. 6, because the element /dev/rdsk/C2t1d1 (20) is the highest-level object, no other element exists in higher hierarchy, and therefore the Parent Link ID is not stored.

The variable Child Link ID is the object name (the element with its controller number of 2 is searched and its value is input. This is explained later again) of the linked object locating in its lower-level hierarchy, and stores the value "fjpfca0". The Branch Check ID is the information required to select one from two Child Links in CA0. In FIG. 6, the Affinity Group 1 is selected therefore, "Affinity Group 1" is stored in the Branch Check ID.

FIG. 8 indicates an example of information stored in the element fjpfca0 (21)(HBA port object). In FIG. 8, the variable Name is the object name of the element, and stores the value "fjpfca0". The variable Parent Link ID stores the object name (Raw Device starting with C2 is searched and its value is input. This is explained later.) of the linked object located in its higher-level hierarchy. That is, "/dev/rdsk/C2t1d1" which is the object in higher hierarchy of the element fjpfca0 is stored.

The variable Child Link ID is the object name (the value searching for the object with WWPN of connected WWPN described later and input to the object) of the linked object located in its lower-level hierarchy, and stores the value "CA0". The variable Controller Number stores the controller number of this HBA port, and the stored value is "2".

The variable WWPN (World Wide Port Name) is the WWPN number of the HBA port, and in the present embodiment, "100000000E2441AD" is stored. The variable Connected WWPN is the WWPN number of the counterpart connecting to the HBA port, and in the present embodiment, "210000000EDA00CD" is stored.

FIG. 9 is an example of information stored in the element CA0 (22) (CA port object). In FIG. 9, the variable Name is the object name of the element, and stores the value "CA0". The variable Parent Link ID is the object name of the linked object located in its higher-level hierarchy, and stores the object in higher-level hierarchy of the element CA, "fjpfca0".

The variable Child Link ID is the object name of the linked object located in lower-level hierarchy, and "Affinity Group 0 and Affinity Group 1" are stored. The variable WWPN is the WWPN number of the CA port, and stores "210000000EDA00CD".

The affinity information is defined as the counterpart WWPN, which permits access with the CA, and the Affinity Group with its use permitted, and stores the "10000000E2441AD:Affinity Group 1" is stored. The parameter Affinity Group is the Affinity Group number set in the CA0, and "0, 1" are stored.

FIG. 10 is an example of the information stored in the element Affinity Group 0 (Affinity Group 0 object). In FIG. 10, the variable Name is the object name of the element, and the value "Affinity Group 0" is stored. The variable Parent Link ID is the object name of the linked object located in its higher-level hierarchy, and "CA0", which is the object in higher-level hierarchy of the element CA, is stored.

The variable Child Link ID is the object name of the linked object located in its lower-level hierarchy. Because the element Affinity Group 0 is the lowest-level element, no other element exists in its lower-level hierarchy, and therefore it does not have the Child Link ID.

FIG. 11 shows an example of information storage in the element Affinity Group 1 (Affinity Group 1 object). In FIG. 11, the variable Name is the object name of the element, and the value "Affinity Group 1" is stored. The variable Parent Link ID is the object name of the linked object located in higher-level hierarchy, and "CA0", which is the object in higher-level hierarchy of the element CA, is stored.

The variable Child Link ID is the object name of the linked object located in lower-level hierarchy. Because the element Affinity Group 1 is the lowest-level element, no other element exists in its lower-level hierarchy, and therefore it does not have the Child Link ID.

In FIG. 7~FIG. 11, the variable values in italic font (Parent Link ID, Child Link ID, and Branch Check ID) are the values input in the relation management control device 1 based on the information of each object (the physical information and the logical information acquired in S1 in FIG. 5). The information other than this is the information acquired from each device as the physical and logical information. A database of the above information can be made in a designated storage unit in the system.

In the following description, details on an example of the present embodiment are set forth.

(Embodiment)

The present embodiment realizes the following:

generating the elements based on the physical and logical information collected from each device and creating the link information indicating the physical and logical relation between elements; and creating relevant information (Branch Check ID), which is the information required to express the relation management and the information that the link information of the element cannot cover, from the information of each element.

Figure 12:
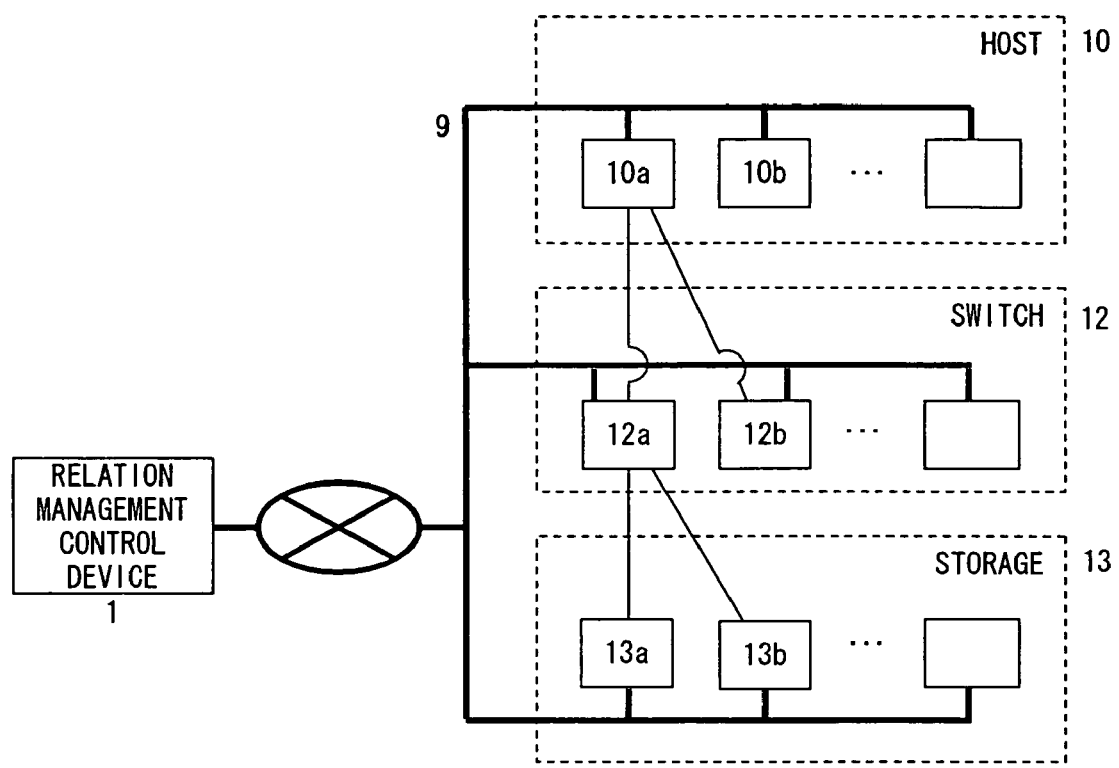
FIG. 12 describes an overview configuration of a system in the first embodiment.

FIG. 12 shows the overview of the system components in the present embodiment. In FIG. 12, a host (a host 10*a*, a host 10*b* . . . ), a switch 12 (a switch 12*a*, a switch 12*b* . . . ), storage 13 (storage 13*a*, storage 13*b* . . . ) constitutes SAN. The host 10, the switch 12 and the storage 13 are connected with a LAN 9. The LAN 9 is connected to the relation management control device 1.

Figure 13:
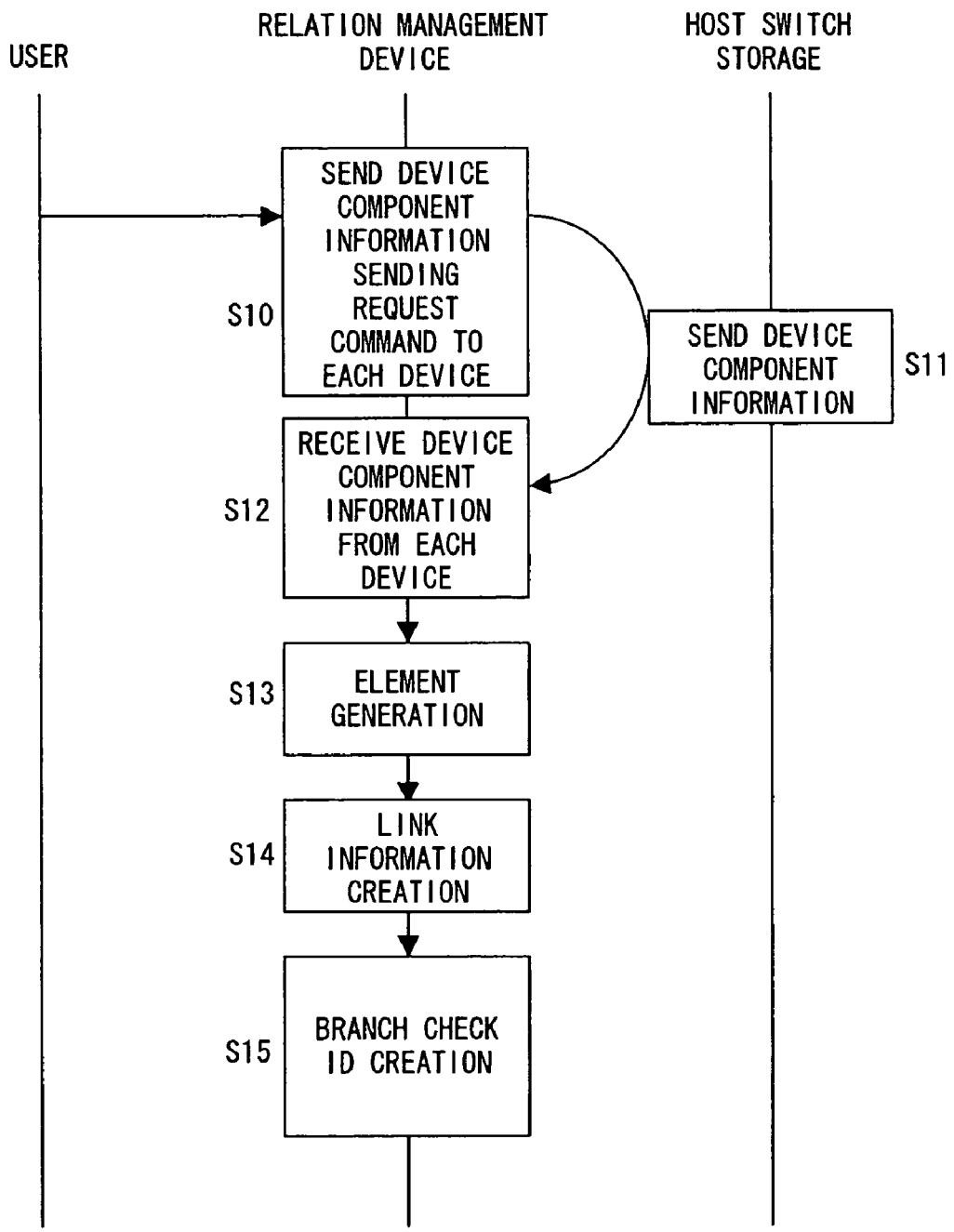
FIG. 13 is a flow showing the relation among users, the relation management control device 1, and each device in the first embodiment.

FIG. 13 describes a flow showing relations among the user, the relation management control device 1 and the host 10/the switch 12/the storage 13 in the present embodiment. The user, first, performs an operation commanding to acquire the element information of the device present on the LAN 9 in the relation management control device 1 (S10).

The relation management control device 1, which received the command, transmits the request information so that each device such as the host 10, the switch 12 and the storage 13 on the LAN 9 sends the device component information (physical information and logical information), which each device contains. Each device receiving this request information sends the device component information to the relation management control device 1 (S11).

The relation management control device 1 receives the device component information transmitted from each device (S12). The physical component element and the logical component element, constituting the device, are each created as an object based on the received device component information. And the information, such as WWPN and connected WWPN, which is the data item not indicated in italic font in FIG. 7~FIG. 11 is stored in each object created. In addition, an ID is given to each object.

Next, the link information indicating physical and logical relations between elements is created (S14) Here, one element stores the IDs of elements, which relates to the element, obtained from the acquired device component information as the Parent Link ID, the Child Link ID and Relative Link ID. However, any value is not stored in the Branch Check ID at that point in time.

The Branch Check ID is created next (S15).

Figure 14:
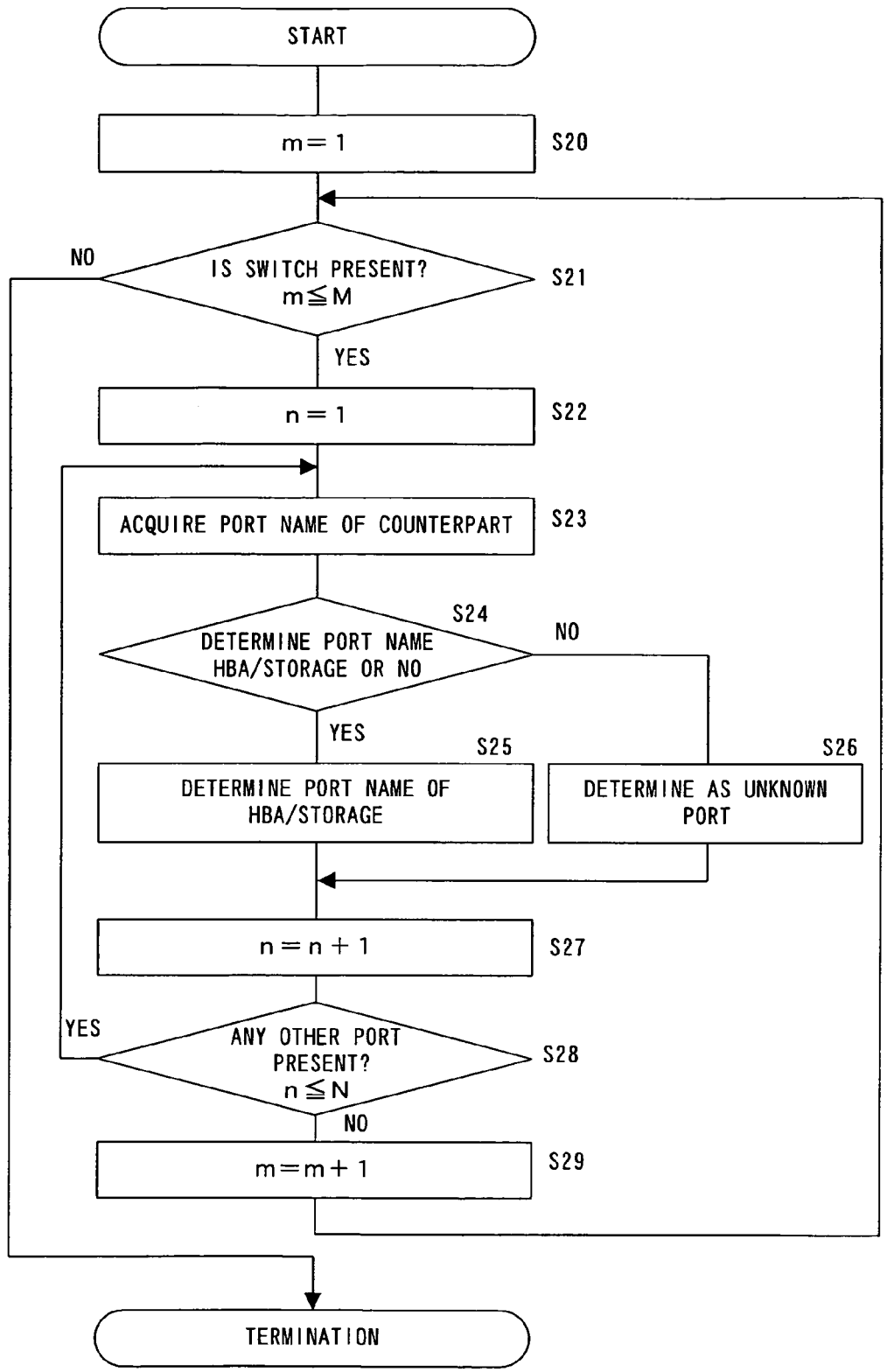
FIG. 14 is a flow for acquiring the port name of connection destination (counterpart) of each port on each switch in the first embodiment.

FIG. 14 is a flow showing the process to acquire the port name of a destination (a counterpart) corresponding each port configured on each switch in S12 in FIG. 13. Given that the number of the switch is M and the number of the port for each switch is N, a variable m is used for the counter of the number of the switch, and a variable n is used for the counter of the number of the port of the switch.

As a first step, m=1 (S20). Next, the presence or the absence of switch on the LAN 9 is determined (S21) When the switch is present (when it is yes), n=1(S22), and the following process of S23~S27 is performed on the first port configured in the switch.

The port name of a destination (a counterpart) of the port is acquired (S23). When the acquired port name is the port name of HBA or storage, the HBA port name or the storage port name is determined (S25), and the process proceeds to S27.

When the port name cannot be acquired in S23 (S24), the port name of the destination is determined as unknown port (S26), and the process proceeds to S27.

Next, by counting up n (S27), whether n≦N or not is determined. When n≦N (when it is yes), the process goes back to S23 and continues the process S23~S27 for the rest of the ports. When n>N (when it is no), the process on all ports configured in the switch is completed, and therefore after counting up m (S29), the process goes back to S21. When the process is completed on all switches, m>M is obtained, then the no prong is selected in S21, and the flow is terminated.

From the above process, the port name of the counterpart connected to the switch can be acquired, and therefore which port is connected to which port can be tracked down. The flow in FIG. 14 is only an example of the process in S11 and S12 in FIG. 13, and thus the way of acquisition differs depending on each of the physical information and the logical information.

FIG. 15 describes an overview of the physical information and the logical information between the host 10 and the storage 13 in the present embodiment. FIG. 15 shows, in the relation management control device 1, the element information created in S13 in FIG. 13. A mirror disk driver 1 (30), multi-path driver 0 (31), and C1*t*1*d*0 (32), C1*t*1*d*1 (33), C1*t*1*d*2 (34), C1*t*2*d*2 (35), C2*t*2*d*0 (36), C2*t*3*d*2 (37), all of which are the logical information of the host, are generated as the elements of the host 21. Also, an HBA (38), a Port α (39), a Port β (40), an HBA (41) are generated as physical information.

For the elements in the storage 13, a CA (42), a Port 1X (43), a Port 0X (44), a Disk 0 (63), a Disk 1 (64), a Disk 2 (65) and a Disk 3 (66), which are implemented as physical information, are generated. Also, as logical element, an Affinity Group 0 (45), an Affinity Group 1 (46), an Affinity Group 2 (47), a Lun 0 (48), a Lun 1 (49), a Lun 2 (50), a Lun 0 (51), a Lun 1 (52), a Lun 2 (53), a Lun 2 (54), a LV 1 (55), a LV 2 (56), a LV 3 (57), a LV 4 (58), a LV 5 (59), a LV 6 (60), a Raid Group 1 (61) and a Raid Group 2 (62) are generated.

The lines connecting the elements in FIG. 15 is the links between the elements after Parent Link ID, Child Link ID and Relative Link ID are stored in each object by the process S14 in FIG. 13.

For example, "the Parent Link ID: the mirror disk driver 0, the Child Link ID: the C1*t*2*d*2, the C2*t*3*d*2" is stored in the multi-path driver 0 (31). In the C2*t*3*d*2 (37), "the Parent Link ID: the multi-path driver 0, the Child Link ID: the Port β" is stored.

The Affinity Group 2 (47) stores "the Parent Link ID: the Port 0X, the Child Link ID: the Lun 2". In the Lun 2 (53), "the Parent Link ID: the Affinity Group 1, the Child Link ID: the LV6" is stored. "The Parent Link ID: the Affinity Group 2, the Child Link ID: the LV6" is stored in the Lun 2 (54).

For the other elements, the same process is carried out storing the ID of the element in higher-level hierarchy than one element as the Parent Link ID, the ID of the element in lower-level hierarchy than the one element as the Child Link ID and the ID of the element relating laterally with the one element as the Relative Link ID.

The case that the Port β (40) is selected in FIG. 15, for example, and downward search is conducted is examined. The elements from the elements of the Port β (40) to the Port 0X (44) inside the storage can be traced.

However, a branch to the Affinity Group 1 (46) and to the Affinity Group 2 (47) occurs in the lower-level hierarchy of the Port 0X (44), and from the information obtained so far, it is not clear which element is to be selected. Then, the Branch Check ID is required. Generation of the Branch Check ID is explained below.

Figure 16:
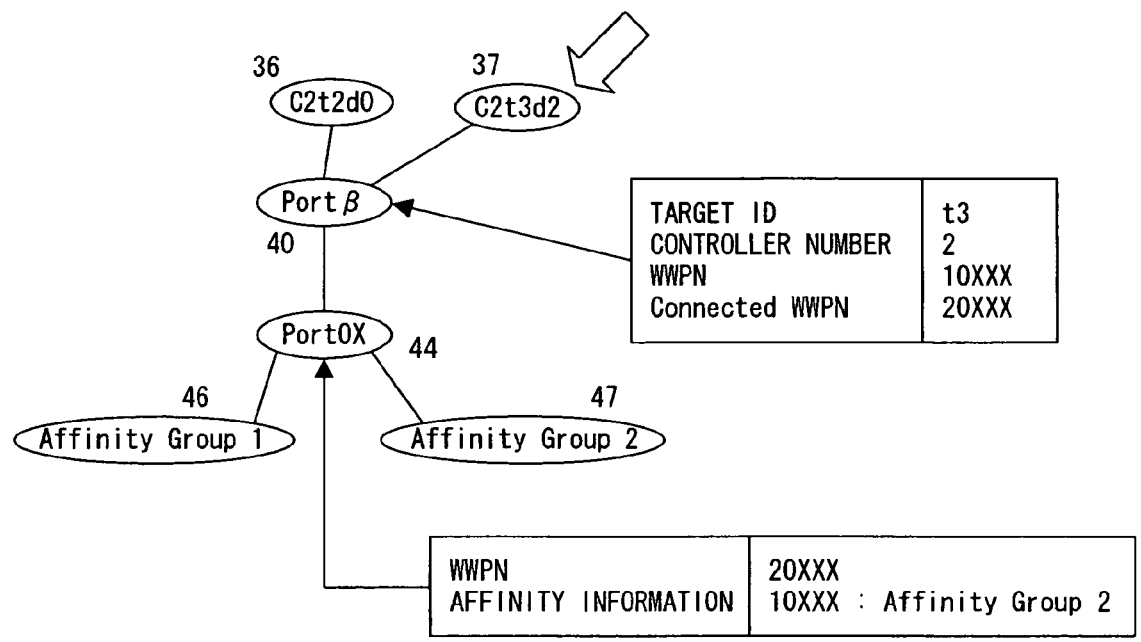
FIG. 16 is a model indicating generation procedure of a branch check ID in the first embodiment.

FIG. 16 is a frame format showing the generation procedure of the Branch Check ID, and the elements 36, 37, 40, 44, 46, and 47 in FIG. 15 are extracted. The elements 36 and 37 represent the data area (instance) shown by C2*t*2*d*0 and C2*t*3*d*2, respectively.

The instances 36 and 37 are generally represented by CXtXdX where CX indicates the controller number, tX indicates the target number, and dX indicates the device number. CX is the number, which the host contains, and is the number for specifying the HBA port, which is used by each instance. For the C2*t*3*d*2 (37), CX=C2, tX=t3, and dX=d2, for example. tX is information determining the route from the Port β to the other element, and the route corresponding is the route the Port β—the Port 0X. Such route information is written in the definition file of the HBA driver. It is also indicated that d2 is the second data area.

In the way described above, each element determines the element relating with itself from the driver definition file etc., and stores the ID of the element in the object as the Parent Link ID or the Child Link ID. Generation of the Parent Link ID and Child Link ID explained above is just an example, and not all the elements have the same process. These are determined by the driver used, the SAN system environment and so forth. The information that an element relates to which element is the information certainly obtained from the using driver.

When C2*t*3*d*2 (37) is selected, as stated above, downward route is determined by the controller number C2 and the target number t3, and the search results in retrieving the Port β and the Port 0X in sequence. However, the route branches into the Affinity Group 1 and the Affinity Group 2 in the lower-level hierarchy of the Port 0X. Therefore, the Port β is to contain the Branch Check ID, which determines the branching destination.

Figure 17:
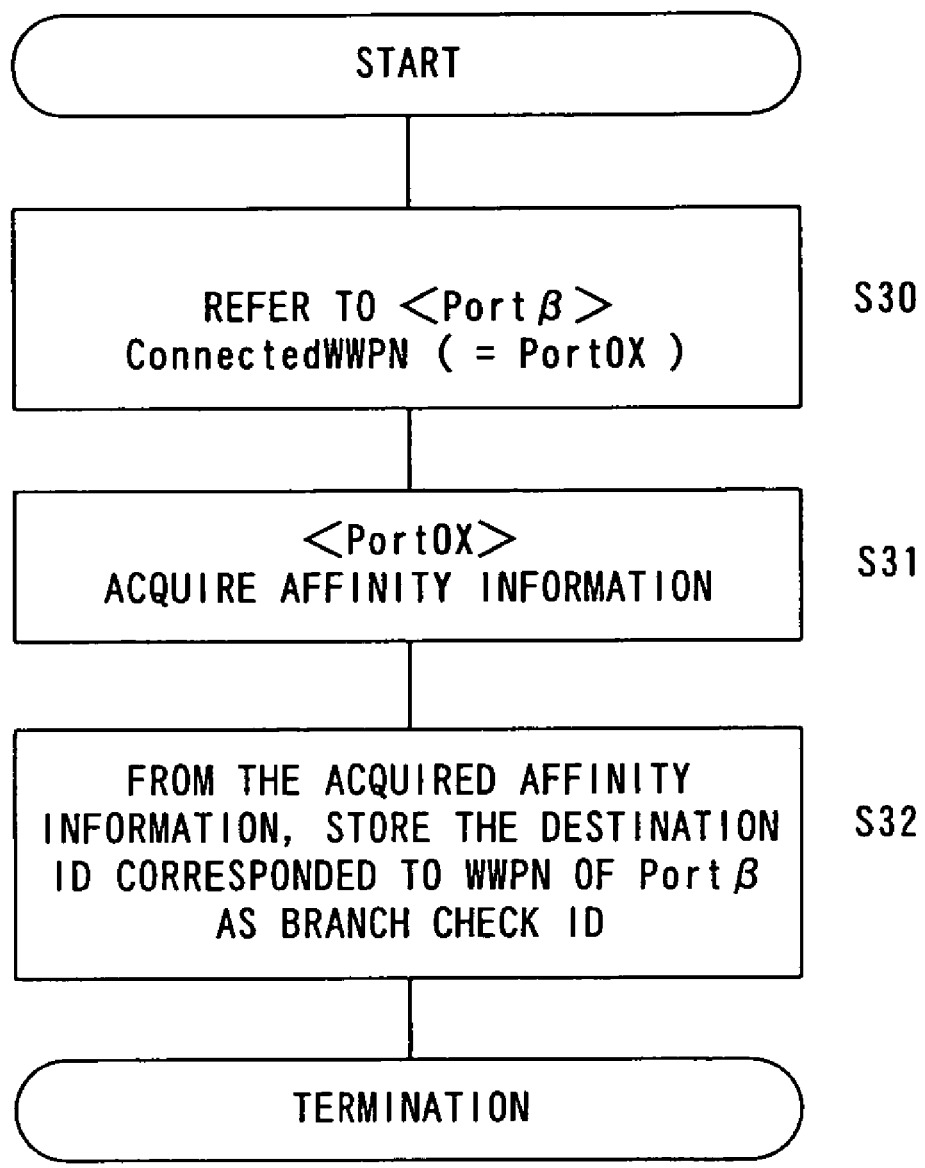
FIG. 17 is a generation flow of the branch check ID in the first embodiment.

FIG. 17 shows an example of a generation flow of the Branch Check ID to be stored in the Port β (40). When referring to the connected WWPN (destination WWPN) of the Port β (30), the value "20XXX" is stored. Then, the affinity information of the element Port 0X (44) with its WWPN is "20XXX" is acquired (S31). When referring to the affinity information, "10XXX:Affinity Group 2" is stored, and therefore it is clear that WWPN "10XXX" (i.e. the Port β) and "the Affinity Group 2" relate each other. Then, "the Affinity Group 2" is stored in the object of the Port β as the Branch Check ID (S32).

The following description examines the case that the Lun 2 (53) inside the storage 13 is selected. When tracing the link from the Lun 2 (53) to the higher-level hierarchy, the Lun 2 (53) is required to select one of the branches of the Port 1X (43) and the Port 0X (44) from the Affinity Group 1 (46). Here, assume the link is the Lun 2 (53_—the Affinity Group 1 (46)—the Port 1X (43)—the Port α (39)—the C1*t*2*d*2 (35). As explained in FIG. 16, and FIG. 17, the port using the Lun 2 (53) is searched from the inside information, and the ID of the retrieved Port 1X (43) is stored in the object of the Lun 2 (53) as the Branch Check ID.

In addition, because the route extends from the Port 1X (43) to the Port α (39), branches at the Port α (39), and goes to the C1*t*2*d*2 (35), the ID of each branching destination is stored as the Branch Check ID. That is, in the object of the Lun 2 (53), "Port 1X, C1*t*2*d*2" is stored as the Branch Check ID.

In such a way, for the element, which requires relation management with a plurality of elements, when the branch information is required, the information (Branch Check ID), which enables to trace the relations, is generated.

Figure 18:
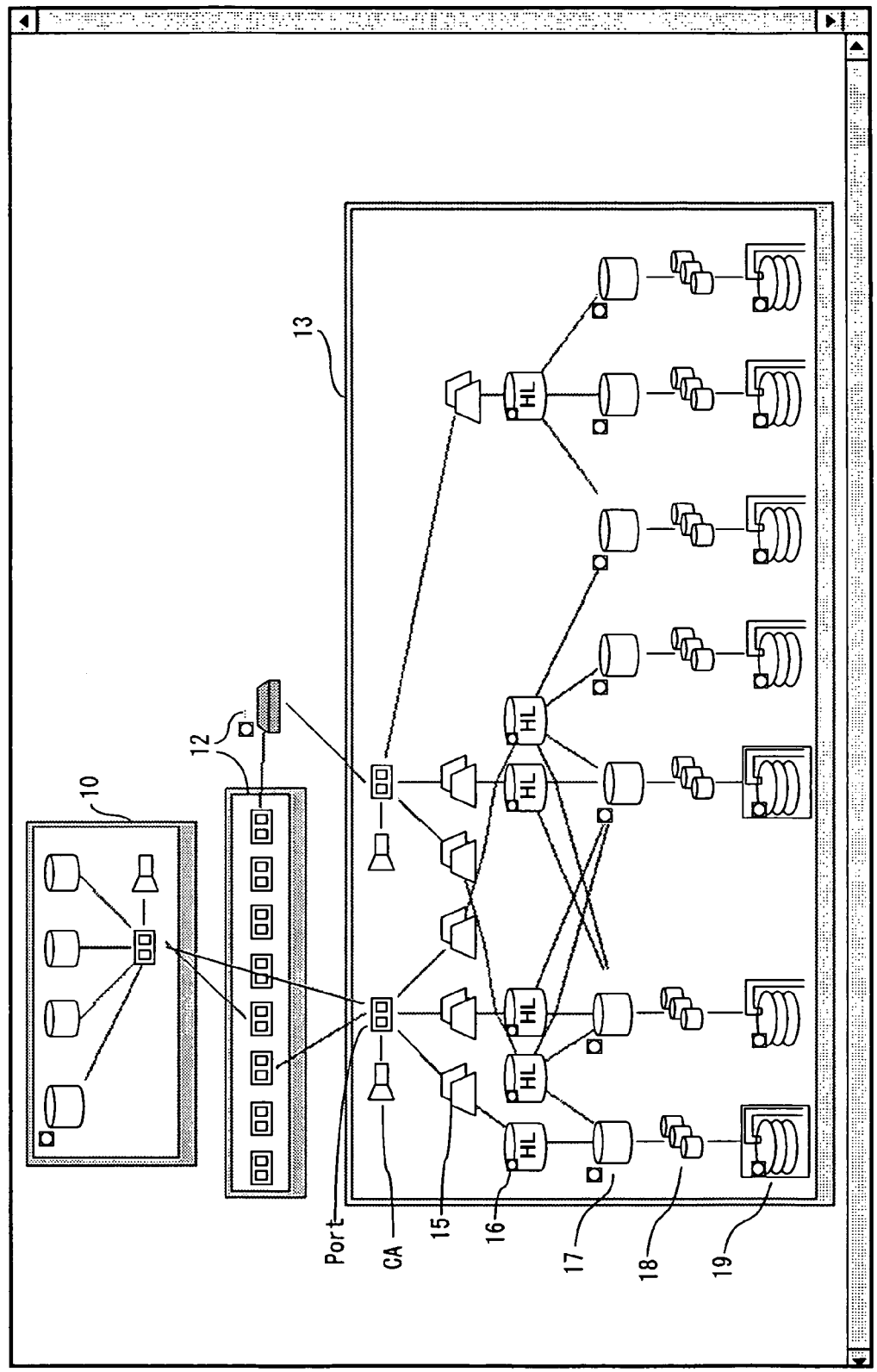
FIG. 18 shows a display screen after the construction of hierarchical link structure in the first embodiment.

FIG. 18 shows the display screen after establishment of the hierarchical link structure in the present embodiment. FIG. 18 is an example of a screen shown on the display of the relation management control device 1. Each element constituting the hierarchical link structure in FIG. 18 is a visual representation of the elements explained in FIG. 4 or FIG. 15 on the screen. In FIG. 18, the association between elements is displayed in lines (link line) on the screen.

From the description above, each element can hold the element information of a branch destination without containing the element information of all the elements linked with the each element. By so doing, because each element does not contain all information of the search route, the redundant information, which each element contains, is to be reduced. As a result, memory waste can be prevented and the loading on the relation management control device 1 can be reduced.

<The Second Embodiment>

By using the elements, the link information, the branch check ID information created in the first embodiment, in the present embodiment, it is possible to search a related element from one element and to display the element.

Figure 19:
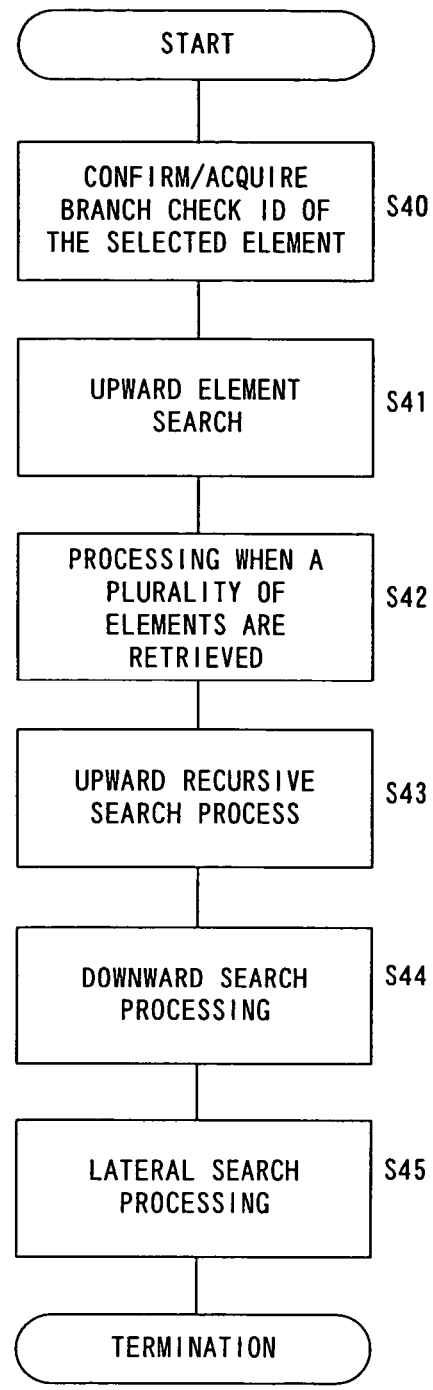
FIG. 19 is a search flow in the second embodiment.

FIG. 19 shows a search flow in the present embodiment. As a prerequisite for search direction, the search proceeds only upward in the upward search, and would never proceed downward during the upward search. The same applies to downward search. First, whether a Branch Check ID is present or not in the selected element K is confirmed (s40).

When a Branch Check ID is present in S40, the Branch Check ID is stored in a prescribed area (the area, which temporarily stores the Branch Check ID during search, and hereinafter referred to as working area). When this search logic has already stored the Branch Check ID in the working area, a new Branch Check ID in the same-level hierarchy is ignored, however a new Branch Check ID in a different-level hierarchy is additionally stored.

Next, element search is conducted upward (parent link search) (S41). When an element L relating to a plurality of elements (P1, P2 . . . ) is retrieved, the IDs of a plurality of those elements and the Branch Check ID acquired in S40 are collated (S42). As the result of collation, when the ID of the element P1, for example, corresponds with the Branch Check ID, it is determined that only the element P1 relating to the ID is linked with the element K, and the IDs of the other elements do not have any relation with the element K.

When a result of collation in S42 shows no correspondence, it is determined that the element K relates to all elements (P1, P2 . . . ). Then the process goes back to S40, search in the Parent Link direction of the related element is repeated recursively (S43).

The same process (S40~S43) is conducted for downward search (Child Link search) (S44). Regarding the lateral direction search (Relative Link search), recursive processing is not conducted beyond a first step. That is, the search for the elements linked in a row is limited to the search on the first one only in the lateral direction search (Relative Link search) (S45).

In the following description, details on the present embodiment are provided.

(Embodiment)

In FIG. 15, a case that the multi-path driver 0 (31) is selected is explained. From the explanation, the route of a sequence of elements relating to the multi-path driver 0 (31) is to be cleared. In the present embodiment, the content of FIG. 15 is displayed in the display image in FIG. 18.

First, the multi-path driver 0 (31) is selected (Arrow A). The link line between the multi-path driver 0 (31) and its Parent Link, the mirror disk driver 0 (30) is highlighted. Here, highlighting means to emphasize the line by blinking, flashing, changing its color, changing its width and so forth so that the difference with the other lines can be clear. Because no element is present in the higher-level hierarchy of the mirror disk driver 0 (30), the upward search is terminated.

The downward search is started next. The multi-path driver 0 (31) does not have a Branch Check ID of branching of the C1*t*2*d*2 (35) and the C2*t*3*d*2 (37) in the lower-level hierarchy, both of the C1*t*2*d*2 (35) and the C2*t*3*d*2 (37) are highlighted, and both branches are to be searched.

Assume that search starts from the C1*t*2*d*2 (35). Then, because the port 1X, the Affinity Group 1 and Lun 2 are stored in the C1*t*2*d*2 (35) as Branch Check ID, these are stored in the work area (see FIG. 20). The Port α (39) in the Child Link of the C1*t*2*d*2 (35) is highlighted, and the Port α (39) is searched.

Although the Affinity Group 0 and the Affinity Group 1 are stored in the Port α (39) as Branch Check ID (see FIG. 21), because the work area has already stored the Affinity Group 1, the Affinity Group 1 in the Port α (39) is ignored.

The Port α (39) has the Port 1X (43) and the Port 0X (44) linked in the Child Link, however, because the Port 1X has been already stored in the working area, the Port 1X (43) is selected, and the Port 1X (43) is highlighted.

The selected Port 1X (43) is linked with the Affinity Group 0 (45) and the Affinity Group 1(46) in the Child Link, however because the Affinity Group 1 has been already stored in the working area, the Affinity Group 1 (46) is selected and the Affinity Group 1 is highlighted.

Because the Port 1X (43) has the CA (42) connected in the relative link, the CA (42) is selected and is highlighted. The selected Affinity Group 1 has the Lun 0 (51), the Lun 1 (52) and the Lun 2 (53) linked in Child Link, however because the Lun 2 has been already stored in the working area, the Lun 2 (53) is selected and is highlighted.

Additionally, LV 6 (60) in the Child Link of the Lun 2 (53) is highlighted. Raid group 2 (62) in the Child Link of the LV 6 (60) is also highlighted. The Disk 2 (65) and the Disk 3 (66) in the Child Link of the RAID group 2 (62) are highlighted as well (a first branch of Child Link search is finished).

To the C2*t*3*d*2 (37), the same processing as described above is performed (Child Link search is conducted, and a second branch search is finished).

The things highlighted can be not only the element searched, but also the link lines between the elements.

Because the Branch Check ID for search can contain the Branch Check ID required in search, each element is not required to constantly hold all information for search, and therefore waste of memory consumption can be prevented. Thus, the loading of the relation management control device 1 in search can be reduced.

Figure 22:
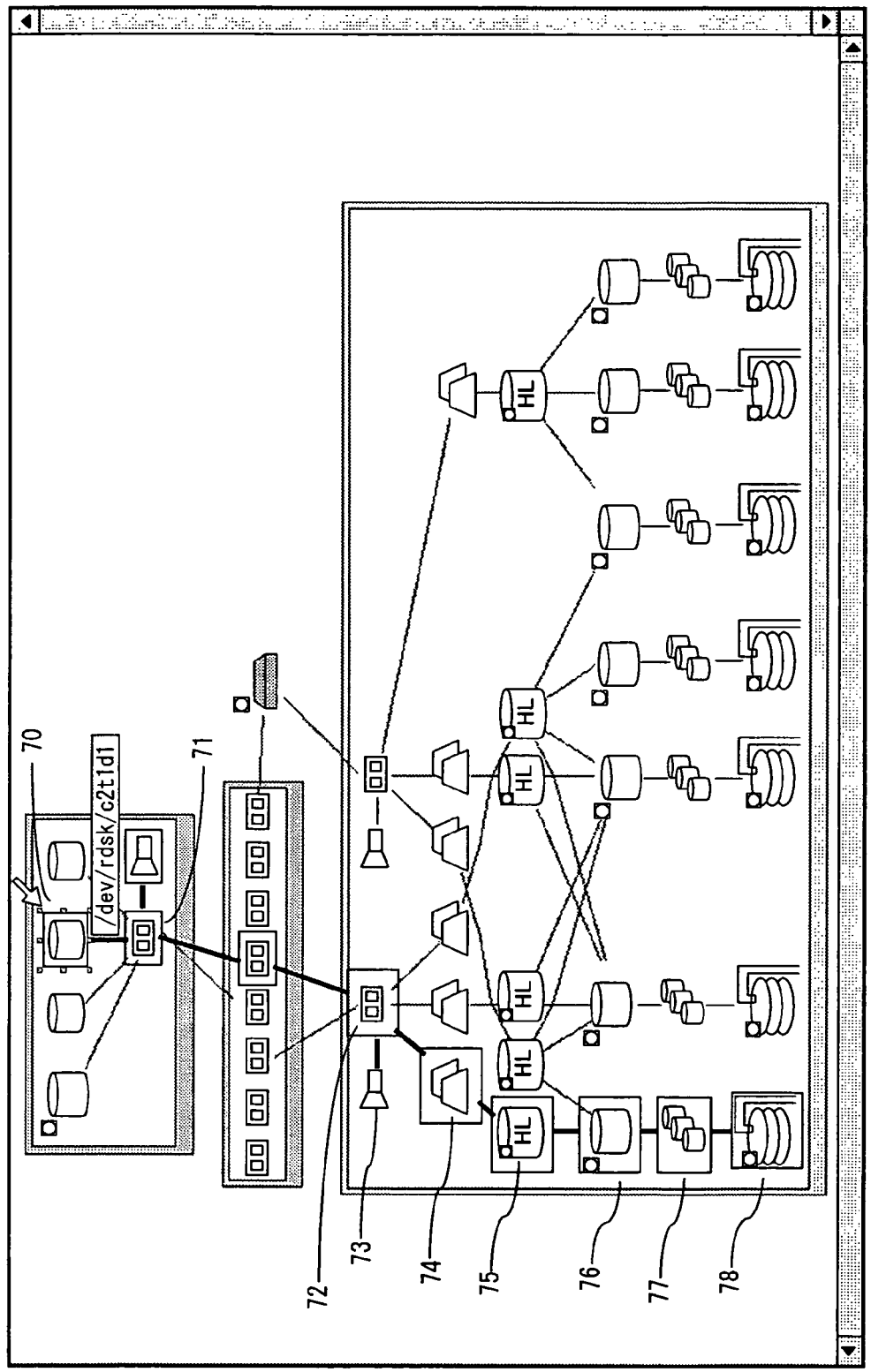
FIG. 22 shows display screen after search process in the second embodiment.

FIG. 22 is an example of display of the link searched in the present embodiment. FIG. 22 is an example of search when the instance 70 is selected. The element 70 is selected by pointing the cursor to the element 70 on the display of the relation management control device 1. By the search flow in FIG. 19, the elements relating to the element 70 are determined, and the link lines between the elements are highlighted. In FIG. 22, each of the elements in the link of the element 70—the element 71—the element 72—the element 74—the element 75—the element 76—the element 77—the element 78 is highlighted, and the link lines between these elements are indicated in bold lines. Each element of the element 72—the element 73 is also highlighted, and the link line between these elements is also highlighted.

From the description above, in searching elements (hardware source, software source, data area source etc.) in a complicated computer system, it is very useful to identify and display the associating elements, providing an effective control of the system.

Figure 23:
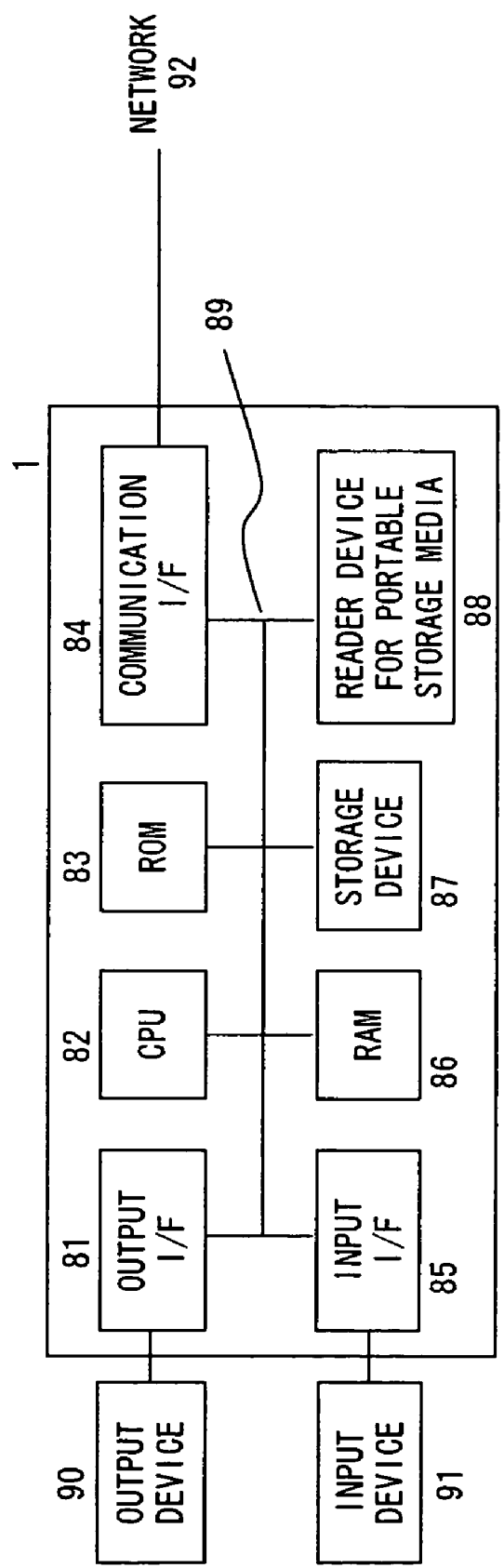
FIG. 23 is a configuration block diagram of the hardware environment of the relation management control device 1 in the first and the second embodiments.

FIG. 23 is a configuration block diagram of hardware environment of the relation management control device 1 used in the first and the second embodiments. In FIG. 23, the relation management control device 1 is constituted by a central processing unit (CPU) 82, read only memory (ROM) 83, random access memory (RAM) 84, a communication interface 84, which is an interface with a network 92 (interface is hereinafter written as I/F), a memory device 87, an output I/F 81, an input I/F 85, a transportable storage media reader 88, and a bus 89 connecting all of the above devices, an output device 90 connected with the output I/F 81, and an input device 91 connected with the input I/F 85.

Various types of memory device such as hard disk and magnetic disk can be used for the memory device 87. Programs etc. processed by the processing explained in the first and the second embodiments are stored in the memory device 87 or the ROM 83, and such programs are executed by the CPU 82.

When provided in the storage of the portable storage media, such programs can be executed by the CPU 82. The portable storage media is set on the reader 88 and the reader 88 reads out the program stored in the portable storage media. Various types of storage media such as a CD-ROM, a flexible disk, an optical disk, a magneto-optical disk and IC card can be used as the portable storage media.

It is also possible that it is sent from a program provider and stored in the memory device 87 via the network 92 and the communication I/F 84, for example.

For the input device 91, keyboards and mice etc. can be used. For the output device 90, displays etc. can be used.

The network 92 can be a network such as the Internet, a LAN, a WAN, an exclusive line, a fixed line and a wireless.

<The Third Embodiment>

In the present embodiment, support in the failure of the storage system is performed using the hierarchical link structure established on the relation management device 1 of the first embodiment.

First, in the online state, information of the storage system is loaded from a server, a switch and storage, and is displayed in GUI (Graphical User Interface).

Next, simulated state of failure in hardware is created (see the first embodiment). Then, which application in the server receives the influence by the simulated failure of the hardware such as the HBA, CA and disks is displayed.

In addition, in replacing the parts of simulated failure, practical training of a sequence of recovery procedure from the simulated failure, that is, programs and functions to be stopped in replacement are displayed ⇒ are stopped ⇒ are replaced ⇒ are recovered, is [c1]provided and supported.

Here, a case that simulated failure has occurred and a case that the actual failure has occurred are explained respectively.

(Embodiment 1)

In the present embodiment, a case that simulated failure has occurred, is explained.

Figure 24:
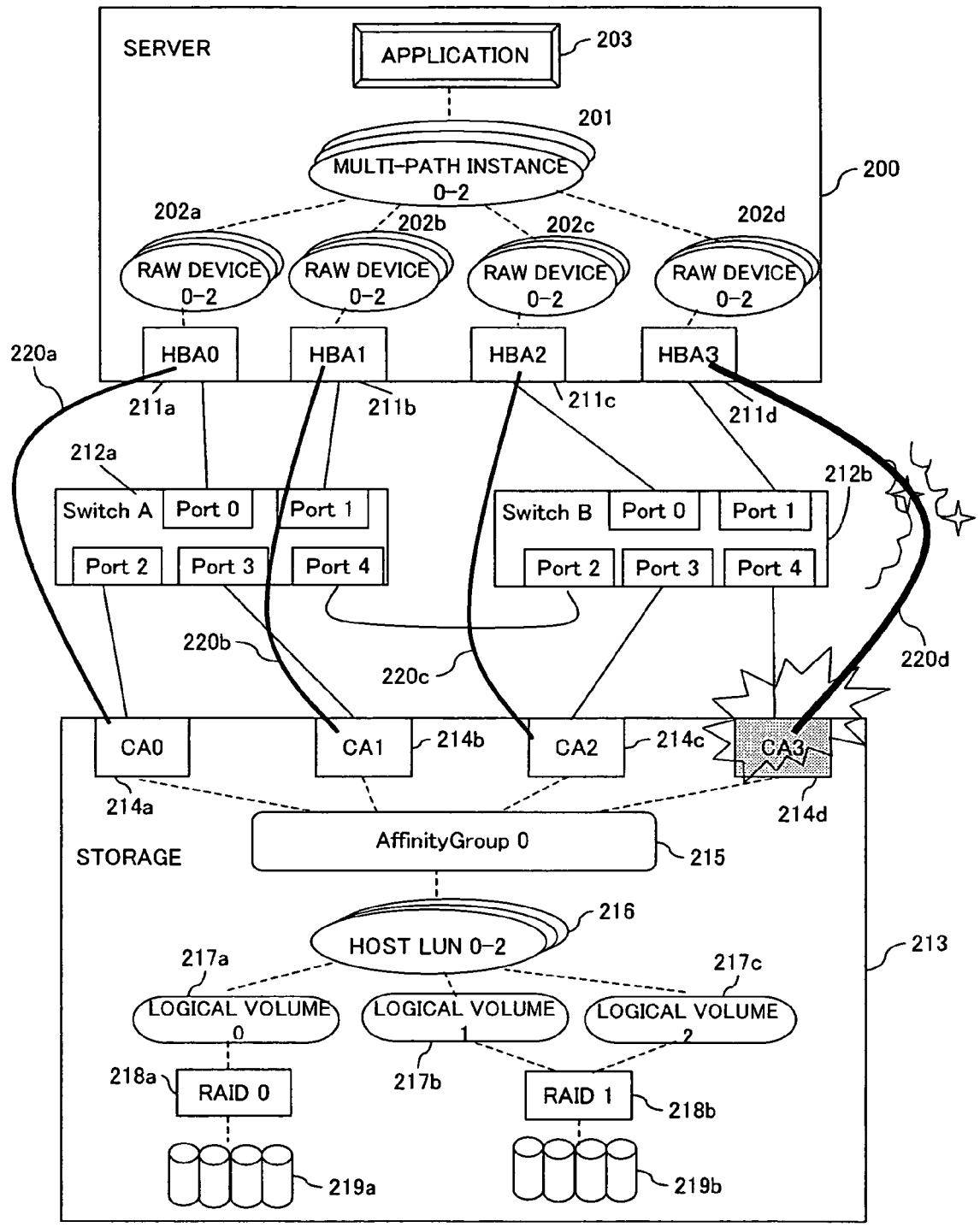
FIG. 24 describes GUI displaying the storage system information loaded from the server, a switch and storage in the third embodiment.

FIG. 24 describes GUI displaying information of storage system loaded from the server, the switch and the storage in the present embodiment. In FIG. 24, a server 200 consists of each element of a multi-path instance 201, RAW devices 202 (201*a*, 201*b*, 201*c*, 201*d*), a HBAs 211 (HBA 0 (211*a*), HBA 1 (211*b*), HBA 2 (211*c*), HBA 3 (211*d*)), and an application 203 operating in the server.

An HBA refers to a host bus adapter, which is an adapter card physically built inside the server connecting a FC (Fiber Channel) cable.

The switch 212 has a switch A (212a) and a switch B (212b). Each of the switches A and B consists of five ports (a port 0, a port 1, a port 2, a port 3, a port 4).

The storage 213 consists of CAs 214 (CA 0 (214a), CA 1 (214b), CA 2 (214c), CA (214d)), an Affinity Group 0 (215), an host LUN (216), logical volumes 217 (logical volume 0 (217a), logical volume 1 (217b), logical volume 2 (217c)), an RAID 218 (RAID 0 (218a), RAID 1 (218b)) and hard disks 219 (219a, 219b).

The Affinity Group is an affinity group. It is a name of a group, which collects up the host LUNs in the device. The host LUN is a name of a data area for confirming from the server and/or the host. The logical volume (Lun V) is defined by a 1 to 1 logical mapping. The logical volume is a name of data area in the storage device, or, on the other words, data area in the RAID.

In FIG. 24, the server 200 is connected to the switch 212) in FC via the HBA 211, and the storage 213 is connected to the switch 212 via the CA 214.

More detailed explanation for the above connection is that the HBA 0 (211a) and the HBA 1 (211b) are physically connected to the port 0 and the port 1 of the switch A (212a), respectively. The HBA 2 (211c) and the HBA 3 (211d) are physically connected to the port 0 and the port 1 of the switch B (212b), respectively.

The CA 0 (241a) and the CA 1 (214b) are physically connected to the port 2 and the port 3 of the switch A (212a), respectively. The CA 2 (214c) and the CA 3 (214c) are physically connected to the port 3 and the port 4 of the switch B (212b), respectively. The port 4 of the switch 212a is physically connected to the port 2 of the switch 212b.

Broken lines in FIG. 24 indicate the logically connecting state between elements, and are called logical relation lines. In the present embodiment, an access path 220 (a logical I/O access route (access logical line) from a server to storage) is configured. Here, I/O indicates input and output. In FIG. 24, an access path 220a between the HBA 0 (211a) and the CA 0 (214a), an access path 220b between the HBA 1 (211b) and the CA 1 (214b), an access path 220c between the HBA 2 (211c) and the CA 2 (214c), and an access path 220d between the HBA 3 (211d) and the CA 3 (214d) are also configured.

In the following description, an explanation of procedure from the generation of simulated failure to recovery is provided. Here, the case that the failure occurs in the CA 3 (214d) is explained.

Figure 25:
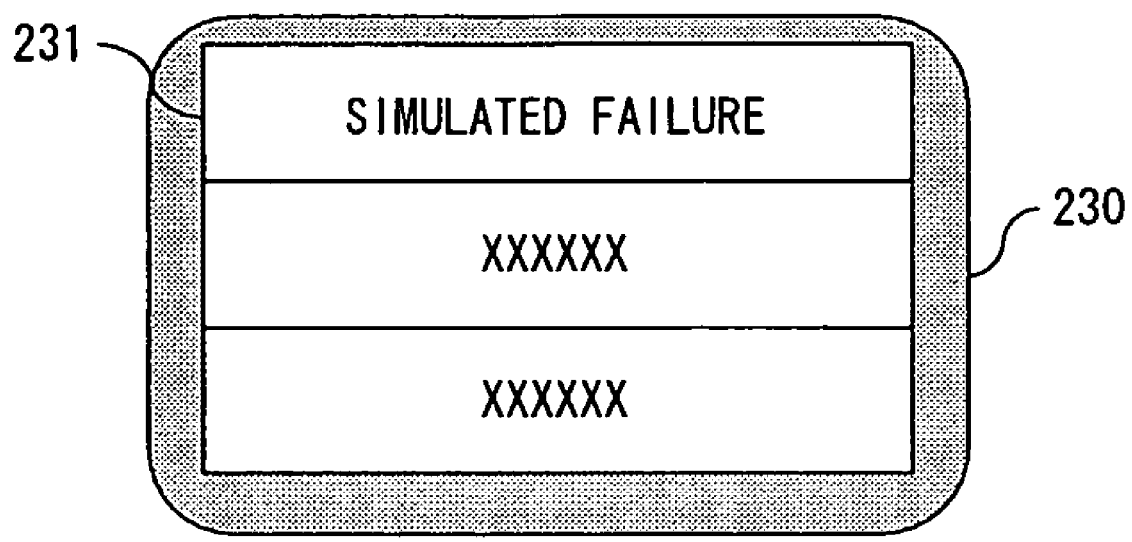
FIG. 25 is a menu display to cause simulated failure in the third embodiment.

First, the CA 3 is pointed with a mouse on the GUI of the relation management control device 1, and with right-click, a menu 230 described in FIG. 25 opens. Then, "simulated failure" 231 is selected from the menu.

Figure 26:
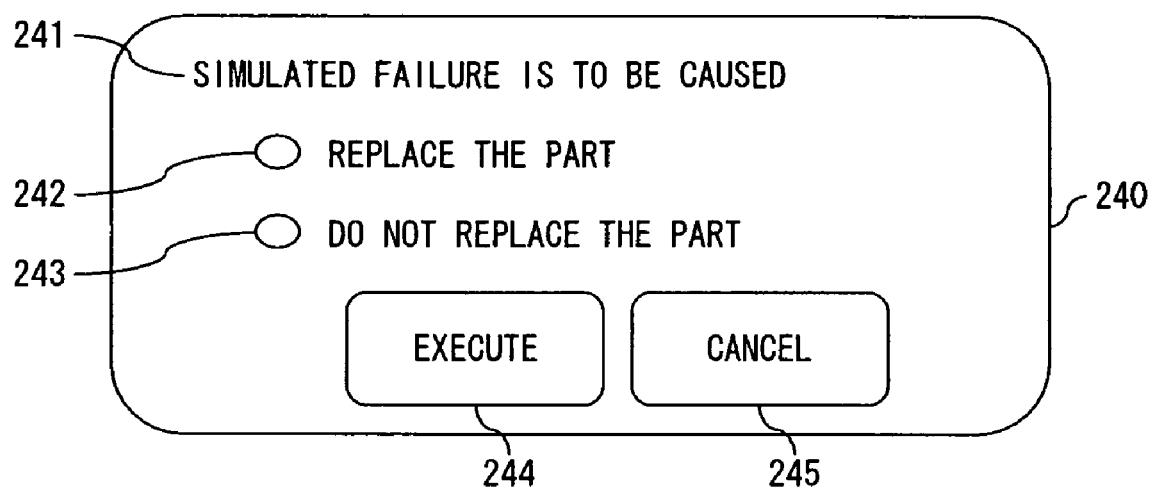
FIG. 26 shows a set up dialog box for the environment of simulated failure in the third embodiment.

When the "simulated failure" 231 is selected, a message dialog box 240 shown in FIG. 26 is displayed. The message dialog box 240 displays a message 241 about setting off the simulated failure, and the environment of the simulated failure can be setup. In FIG. 26, either one of two options "replace the parts" 242 or "do not replace the parts" 243 is selected.

Here, the physical part to be in simulated failure, the CA 3 (214d) in the present embodiment, is clicked to cause a simulated failure, and whether to follow maintenance sequence after replacing the failure parts or to proceed the operation by executing maintenance operation without replacing but under an assumption of replacing the part in simulated failure can be selected.

After selecting either one of "replace the parts" 242 or "do not replace the parts" 243 in the above step, an execute button 244 is to be clicked on. When the simulated failure is not executed, a cancel button 245 is to be clicked on.

When the "execute" button 244 is clicked, as shown in FIG. 24, the CA 3 (241d) is highlighted, the relating access path 220d becomes luminous, and I/O (input/output) via the access path 220d cannot be carried out as it is in error state.

As for methods to cause simulated failure after clicking on the "execute" button 244 in FIG. 26, there are the following two. One is a first method, which generates the simulated failure only in the program of the relation management control device 1, and another is a second method, which sends a command to the failed device and makes the device itself cause simulated failure.

In the first method, the simulated failure is caused only within the application on the relation management control device 1, and therefore, each device on the SAN operates normally.

In the second method, by sending commands such as stopping and logically separating the CA 3 (214d) to the storage 213, the simulated failure is caused. A control unit of the storage 213, which received the commands, identifies each component element such as the CA 3 (214d) and host LUN 216, which have arguments of the commands, and causes simulated failure on the identified component elements.

The storage 213 constantly monitors the component elements in the storage. When the error occurs to the component elements, its error information is transmitted to pre-registered destination (IP address, for example) as a message.

In the present embodiment, the destination of the message is the relation management control device 1, and when it receives the message, the relation management control device 1 is controlled to display the message on the screen. However, in such a case, because the simulated failure is caused intentionally on the command of a user, this message display is suppressed.

Figure 27:
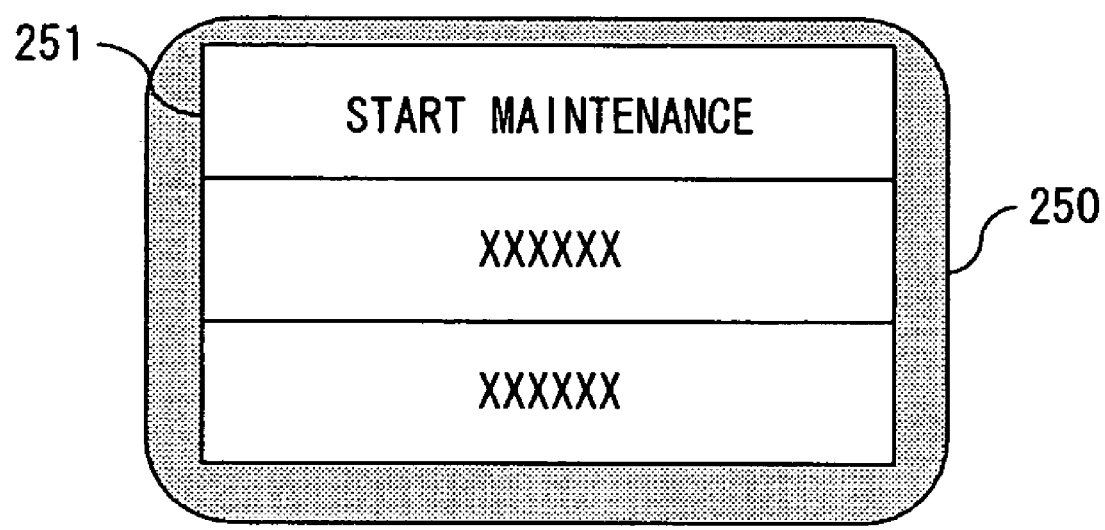
FIG. 27 is a menu display to start maintenance in the third embodiment.
Figure 28:
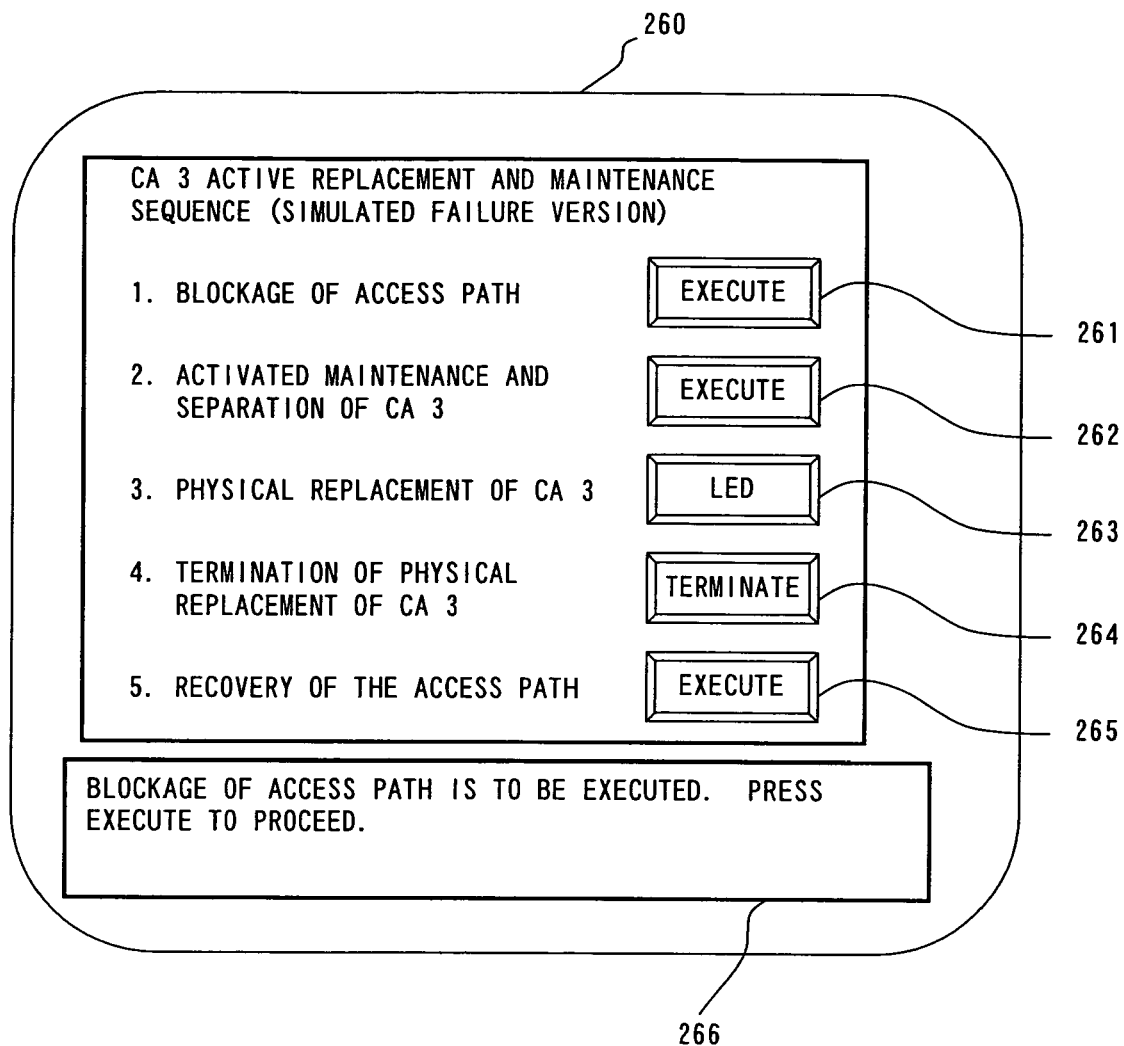
FIG. 28 shows a maintenance dialog box in the third embodiment.

The above CA 3 (214d) in the simulated failure state is pointed and right-clicked by mouse, a menu 250 shown in FIG. 27 opens, and the selection of "start maintenance" 251 opens a message dialog box in FIG. 28.

FIG. 28 shows a maintenance message dialog box 260 in the present embodiment. Items in the maintenance message dialog box 260 depend on the selected element of the simulated failure, that is, the CA 3(214d) in the present embodiment. In the dialog box 260, the process of "1. Blockage of access path", "2. Activated maintenance and separation of the CA 3", "3. Physical replacement of the CA 3", "4. Termination of physical replacement of the CA 3" and "5. Recovery of access path" is performed in sequence. An informative frame section 266 displays an explanation of each process.

First, when an "execute" button 261 is clicked to perform the "1. Blockage of access path", a "multi-path blockage" command, configured by multi-path driver of a server with an access path relating to the CA 3 (214d) to be maintained and replaced, is issued to the server 200. The server 200, which received the command, blocks the access path 220d specified by the command. That is, the access path 220d is logically disconnected.

When an execute button 262 is clicked to execute the "2. Activated maintenance and separation of the CA 3", a command (starting the activated maintenance and separation) required for maintenance and replacement of the CA 3 is issued to the storage 213 implementing the CA 3. By so doing, the CA 3 is logically separated from the storage 213.

Next, "3. Physical replacement of the CA 3" is carried out. Here, the CA 3 (214d) is physically replaced. When an LED button is clicked, the parts to be replaced can become luminous, if the parts have LED fixed. In other words, if "Do not replace the parts" 243 is selected in FIG. 26, the physical replacement operation does not occur, and thus the process skips to the next sequence.

In the above case, when the physical replacement is terminated or when the physical replacement does not occur, a terminate button 264 is clicked and replacement operation is terminated. On clicking of the terminate button, a command notifying the termination of the physical replacement of the CA 3 (214d) is issued to the storage 213. The storage 213, which received the command, can recognize the termination of the physical replacement of the CA 3 (214d).

If the actual replacement is not carried out, a command, which makes the simulated failure CA 3 (214d) normal, is issued.

Next, an execute button is clicked to execute "5. Recovery of access path", a command to open and recover the access path is issued to the server 200, which blocked the path by the access path blockage. The server 200, which received the command, logically connects the access path 220d.

The process above is a recovery sequence for the failure of the CA 3 (241d), and it is not limited to the present embodiment. Other devices may have other recovery sequences according to the device.

The process described above allows practical training of a sequence of response process from the simulated failure, and thus enables the immediate initial process when the actual failure occurs.

(Embodiment 2)

In the present embodiment, an explanation of a case that the actual failure occurs is provided. When the failure is actually caused on the SAN (suppose an actual failure occurred on the CA 3 (214d) in the present embodiment), in a case that the GUI of FIG. 24 is displayed on the screen of the relation management control device 1, as explained in Embodiment 1, an error message is overlaid on the display.

In the storage 213, each component element such as the CA 214 and the host LUN 216 are monitored. In the present embodiment, because an error occurred in the CA 3 (214d), the error information is sent to a pre-registered destination (IP address, for example) as a message. In the present embodiment, the destination is the relation management control device 1, and when the relation management control device 1 receives the message, the message is displayed on its screen. The error message includes event information indicating the failed device and error content, and as shown in FIG. 29, the message is stored in the storage device in the relation management control device 1 as a history.

FIG. 29 is a history dialog box indicating the state of each device on the SAN. The relation management control device 1 can separately manage the state of each device as history. Likewise, the error above is stored in the storage device as history. In FIG. 29, information such as "state" indicating "Error", "Warning" and so forth, "time" indicating when the state began, "device name" indicating which device has the state, "monitor", "event ID" and "event information" indicating the error information is managed as history.

When the above error message is closed, the display has already had the same state as described in FIG. 24. That is, the failure location CA 3 (214d) is highlighted, and the access path 220d become luminous. Then, if the CA 3 (214d) is pointed and right-clicked, the menu 250 in FIG. 27 opens, and with the selection of start maintenance 251, the maintenance dialog box 260 in FIG. 28 is displayed. The following process is the same as that in Embodiment 1.

In the conventional SAN, failure detection and maintenance had depended on manual effort, and had taken significant cost in terms of time and labor. However, by implementation of the present invention, failure location can be automatically detected, maintained and recovered.

The present invention helps users to understand the connection and logical relation control state in the system of the SAN, and facilitates elucidation of the range influenced by the failure. Also, effective utilization of memory can be achieved preventing the reduction of processing speed caused by an unnecessary loading.

In addition, an easy and immediate response to the failure in the SAN can be also realized.

What is claimed is:

1. A non-transitory computer-readable storage medium storing a relation management control program, making a computer execute management processing of relation between at least two devices among an information processor device, a switch device and a storage device configuring a storage area network, the computer being connected to the information processor device, the switch device and the storage device via a network different from the storage area network, which also make the computer execute:

a device component information acquisition process, which acquires device component information indicating at least either one of physical and logical configuration of the storage area network of at least two of the devices using the network different from the storage area network;

an element information creation process, which creates element information of the storage area network corresponding to the device component information using the device component information acquired by the device component information acquisition process;

a recovery process, which recovers, in state of failure occurred in at least any one of the pieces of element information, the element information from the state of failure;

a simulated failure setting process, which selects at least one of the element information, and sets the state of failure by causing the simulated failure in the selected element information;

an association process, which associates each piece of the element information to each other using a plurality of pieces of element information created by the element information creation process so as to establish a hierarchical link structure of the storage area network; and a specific logical relation information setting process which, when intermediate element information that is element information between first element information and second element information connected to the first element information via a logical connection path on the storage area network has a branch other than the logical connection path, creates specific logical relation information of the storage area network specifying the element information connected via the logical connection path from among a plurality of pieces of adjacent element information connected to the intermediate element information via the branch on the storage area network and which sets the specific logical relation information to the first element information, wherein the first element information is an object including the specific logical relation information and at least one among a unique name of a neighboring third element information in higher-level hierarchy of the first element information, a unique name of a neighboring fourth element information in lower-level hierarchy of the first element information and a unique name of a neighboring fifth element information in the same level hierarchy of the first element information, the second element information is an object including at least one among a unique name of a neighboring sixth element information in higher-level hierarchy of the first element information, a unique name of a neighboring seventh element information in lower-level hierarchy of the first element information and a unique name of a neighboring eighth element information in the same level hierarchy of the first element information, the intermediate element information does not include the specific logical relation information, and the specific logical relation information setting process sets specific logical relation information to the first element information which constitutes the hierarchical link structure of the storage area network.

2. The non-transitory computer-readable storage medium according to claim 1, wherein the element information creation process gives a unique name on created element information.

3. The non-transitory computer-readable storage medium according to claim 1, wherein the simulated failure setting process makes a computer execute a process to display a message to prompt the determination whether the part of the device corresponding to the element information should be replaced or not.

4. The non-transitory computer-readable storage medium according to claim 1, wherein the recovery process makes a computer execute:
- a logical transmission/reception route blockage process, which blocks the logical transmission/reception route relating to the element information set to be in the state of failure, among the logical transmission/reception routes for information exchanged between devices;
- a separating process, which logically separates the part of the device corresponding to the element information set to be in the state of failure; and
- an opening process, which opens the logical transmission/reception route blocked by the logical transmission/reception route blockage process.

5. The non-transitory computer-readable storage medium according to claim 1, makes a computer further execute a display process, which displays a logical connection between the devices and in the devices using the pieces of element information associated to each other by the association process and the device component information set by the specific logical relation information setting process.

6. A relation management control device for managing relation between at least two devices among an information processor device, a switch device and a storage device configuring a storage area network, the relation management control device being connected to the information processor device, the switch device and the storage device via a network difference from the storage area network, the relation management control device comprising:
- a memory; and
- a processor that executes a program including a procedure, the procedure comprising:
  - acquiring device component information indicating at least either one of physical and logical configuration of the storage area network of at least two of the devices using the network different from the storage area network through an input interface;
  - creating element information of the storage area network corresponding to the device component information using the acquired device component information;
  - associating each of the pieces of element information to each other using a plurality of pieces of the created element information so as to establish a hierarchical link structure of the storage area network;
  - recovering the element information from a state of failure occurred in at least any one of the element information;
  - selecting at least one of the element information, and setting the state of failure by causing the simulated failure in the selected element information;
  - when intermediate element information that is element information between first element information and second element information connected to the first element information via a logical connection path on the storage area network has a branch other than the logical connection path, creating specific logical relation information of the storage area network specifying the element information connected via the logical connection path from among a plurality of pieces of adjacent element information connected to the intermediate element information via the branch on the storage area network, and setting the specific logical relation information to the first element information; and
  - outputting the set specific logical relation information through an output interface, wherein the first element information is an object including the specific logical relation information and at least one among a unique name of a neighboring third element information in higher-level hierarchy of the first element information, a unique name of a neighboring fourth element information in lower-level hierarchy of the first element information and a unique name of a neighboring fifth element information in the same level hierarchy of the first element information, the second element information is an object storing at least one among a unique name of a neighboring sixth element information in higher-level hierarchy of the first element information, a unique name of a neighboring seventh element information in lower-level hierarchy of the first element information and a unique name of a neighboring eighth element information in the same level hierarchy of the first element information, the intermediate element information does not include the specific logical relation information, and the setting sets specific logical relation information to the first element information which constitutes the hierarchical link structure of the storage area network.

7. The relation management control device according to claim 6, wherein, the creating gives a unique name on created element information.

8. The relation management control device according to claim 6, wherein, the selecting of the element information displays a message to prompt the determination whether the part of the device corresponding to the element information should be replaced or not.

9. The relation management control device according to claim 6, wherein, the recovering unit blocks a logical transmission/reception route, among the logical transmission/reception routes for information exchanged between devices, which relates to the element information, set to be in the state of failure, logically separating the part of the device corresponding to the element information set to be in the state of failure, and opening the blocked logical transmission/reception route.

10. The relation management control device according to claim 6, the procedure further comprising displaying a logical connection between the devices and in the devices using the element information associated with each other and the set specific logical relation information.

11. A system, comprising:
- an information processor device in a storage area network;
- a switch device in the storage area network;
- a storage device in the storage area network; and
- a relation management control device that manages relation between at least two devices among the information processor device, the switch device and the storage device in the storage area network, the relation management control device being connected to the information processor device, the switch device and the storage device via a network different from the storage area network,
- wherein the relation management control device includes a memory and a processor executing a program including a procedure, the procedure comprising:
- acquiring device component information indicating at least either one of physical and logical configuration of the storage area network of at least two of the devices using the network different from the storage area network;
- creating element information of the storage area network corresponding to the device component information using the acquired device component information;
- associating each of the pieces of element information to each other using a plurality of pieces of the created element information so as to establish a hierarchical link structure of the storage area network;
- recovering the element information from a state of failure occurred in at least any one of the element information.
- selecting at least one of the element information, and setting the state of failure by causing the simulated failure in the selected element information;
- when intermediate element information that is element information between first element information and second element information connected to the first element information via a logical connection path on the storage area network has a branch other than the logical connection path, creating specific logical relation information of the storage area network specifying the element information connected via the logical connection path from among a plurality of pieces of adjacent element information connected to the intermediate element information via the branch on the storage area network, and setting the specific logical relation information to the first element information;
- searching for the element information in a prescribed direction starting from the first piece of element information of a plurality of pieces of the associated element information;
- acquiring the specific logical relation information; and
- determining one piece of element information among a plurality of pieces of the element information, when the intermediate element information is associated with the other in a plurality of pieces of element information, using the acquired specific logical relation information, wherein
- the first element information is an object including the specific logical relation information and at least one among a unique name of a neighboring third element information in higher-level hierarchy of the first element information, a unique name of a neighboring fourth element information in lower-level hierarchy of the first element information and a unique name of a neighboring fifth element information in the same level hierarchy of the first element information,
- the second element information is an object storing at least one among a unique name of a neighboring sixth element information in higher-level hierarchy of the first element information, a unique name of a neighboring seventh element information in lower-level hierarchy of the first element information and a unique name of a neighboring eighth element information in the same level hierarchy of the first element information,
- the intermediate element information does not include the specific logical relation information, and
- the setting sets specific logical relation information to the first element information which constitutes the hierarchical link structure of the storage area network.

12. The according to claim 11, the procedure further comprising displaying a logical connection between the devices and in the devices using the pieces of element information associated with each other and the set specific logical relation information.

* * * * *

UNITED STATES PATENT AND TRADEMARK OFFICE
CERTIFICATE OF CORRECTION

PATENT NO. : 8,380,823 B2  
APPLICATION NO. : 11/235413  
DATED : February 19, 2013  
INVENTOR(S) : Sachiko Terai et al.

Page 1 of 1

It is certified that error appears in the above-identified patent and that said Letters Patent is hereby corrected as shown below:

In the Claims

Column 18, Line 65, In Claim 1, delete "higher- level" and insert -- higher-level --, therefor.
Column 21, Line 32, In Claim 11, delete "information." and insert -- information; --, therefor.
Column 22, Line 38, In Claim 12, delete "according" and insert -- system according --, therefor.

Signed and Sealed this  
Fourteenth Day of May, 2013

Teresa Stanek Rea  
*Acting Director of the United States Patent and Trademark Office*